United States Patent [19]

Howell et al.

[11] Patent Number: 4,756,067

[45] Date of Patent: Jul. 12, 1988

[54] MANUAL REPLACEMENT OF OLD SPLIT-PIN ASSEMBLIES BY NEW SPLIT-PIN ASSEMBLIES

[75] Inventors: David A. Howell, Plum Boro; Arthur W. Kramer, Murrysville Boro; Joseph J. Hahn, Brentwood, all of Pa.

[73] Assignee: Westinghouse Electric Corp., Pittsburgh, Pa.

[21] Appl. No.: 891,016

[22] Filed: Jul. 31, 1986

[51] Int. Cl.[4] .............................................. G21C 19/00
[52] U.S. Cl. ............................ 29/402.08; 29/426.4; 29/723; 29/26 B; 29/906; 376/260
[58] Field of Search ............... 376/260, 261; 29/26 B, 29/33 K, 426.4, 400 N, 723, 402.08; 414/146

[56] References Cited

U.S. PATENT DOCUMENTS

| | | | |
|---|---|---|---|
| 2,436,251 | 2/1948 | Dobie et al. | 29/426.4 |
| 2,752,671 | 7/1956 | Alyea | 29/426.4 |
| 3,654,690 | 4/1972 | Hardin | 29/426.4 |
| 4,585,613 | 4/1986 | Styskal et al. | 376/260 |
| 4,590,671 | 5/1986 | Havoic-Conroy | 376/260 |
| 4,624,042 | 11/1986 | Green | 29/426.4 |

*Primary Examiner*—Deborah L. Kyle
*Assistant Examiner*—Daniel Wasil

[57] ABSTRACT

A replacement station includes an old split-pin-assembly (OSPA) removal stand and a new split-pin-assembly (NSPA) installation stand. The removal stand includes a saw and a drill. With the guide tube to which the OSPA is secured in the removal stand, the saw severs each OSPA below the flange which engages the base of the lower counterbore in the lower guide tube (LGT) separating the OSPA into a pin fragment and a second fragment including the flange and the remainder of the split-pin with the nut threaded into it. The second fragment remains secured to the LGT after the sawing operation. The guide tube is rotated so that the drill is coaxial with the shank of the pin of the second fragment. The second fragment is separated into a third fragment including the flange and a fourth fragment including the remainder of the pin and the nut both removable from the LGT. The installation stand has NSPA blades in which the new split pins are mounted. The LGT sans the OSPA's is positioned on the installation stand. The new nuts are mounted and torqued into the split pins with a long-handled runner and a torque tool permitting a measured torque to be applied to the new nut. Then the cups on the nuts are crimped by a long-handled crimping assembly which has fixed crimping jaws that produce the crimping by moving parallel to the wall of the cup.

25 Claims, 28 Drawing Sheets

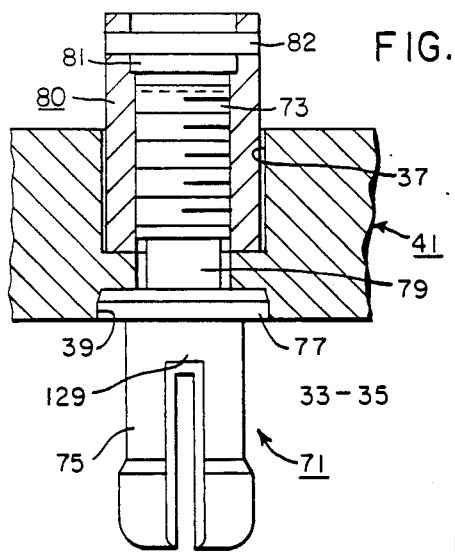
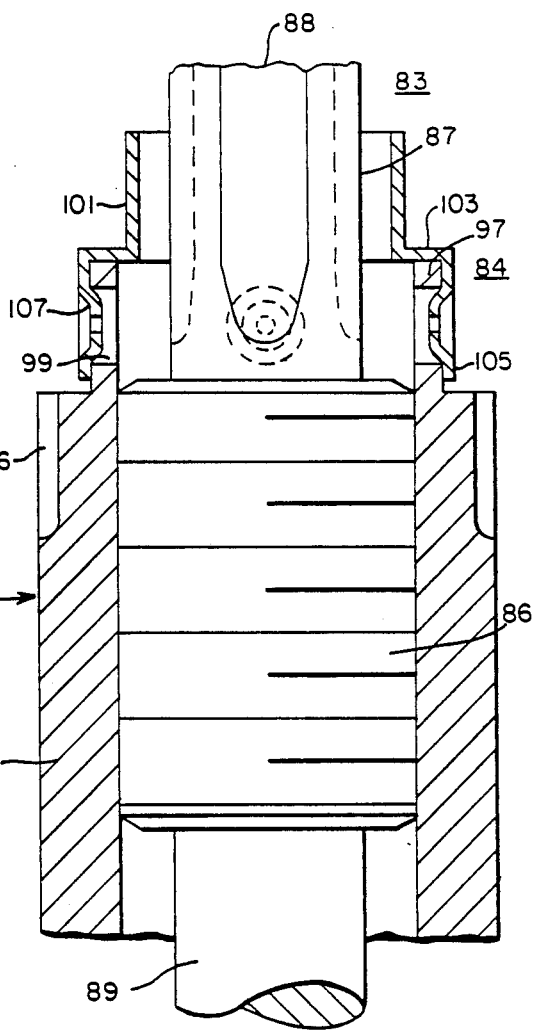
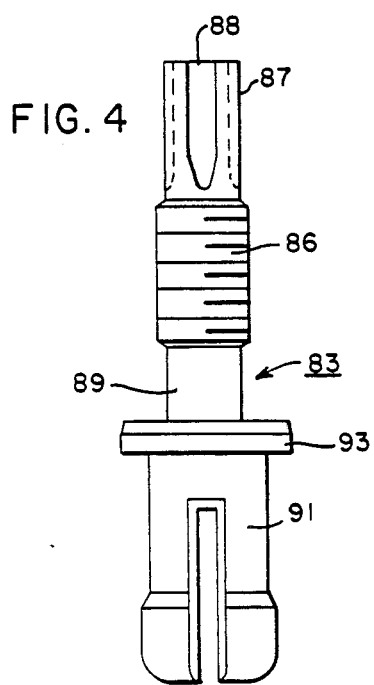

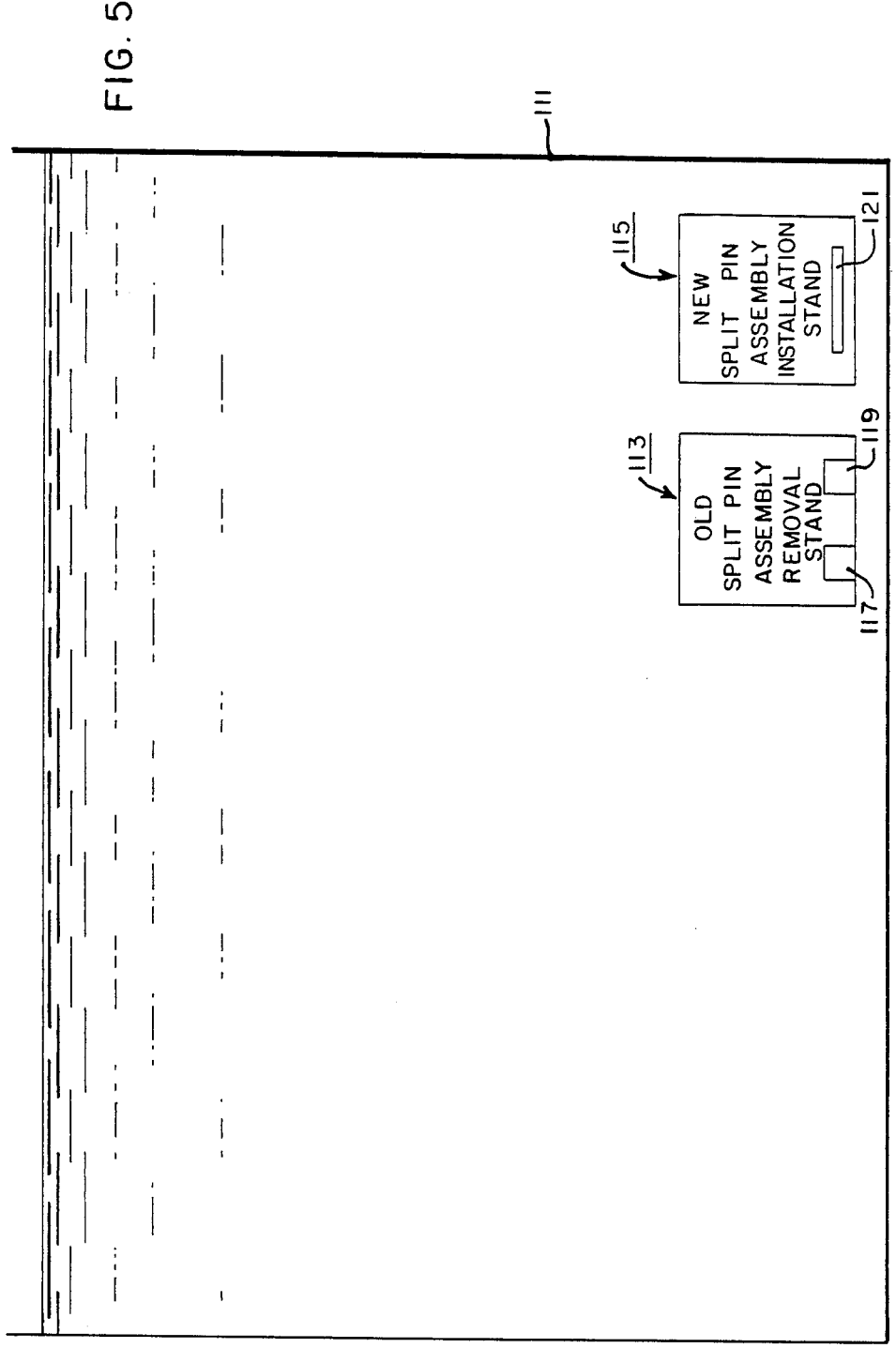

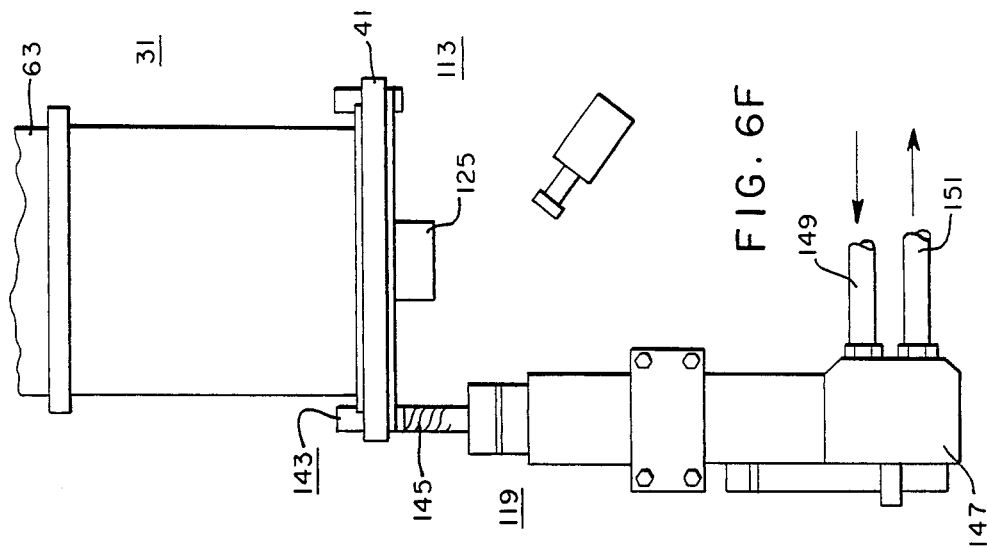
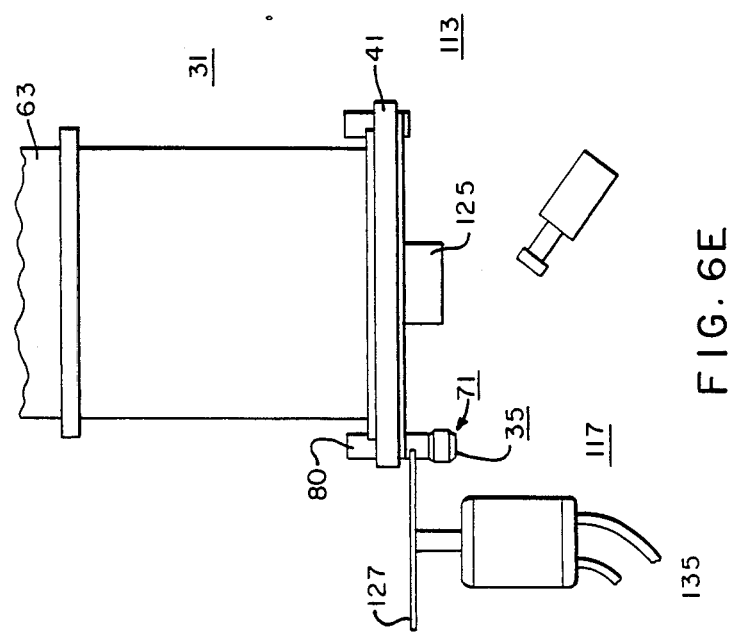
FIG. 6F
FIG. 6E

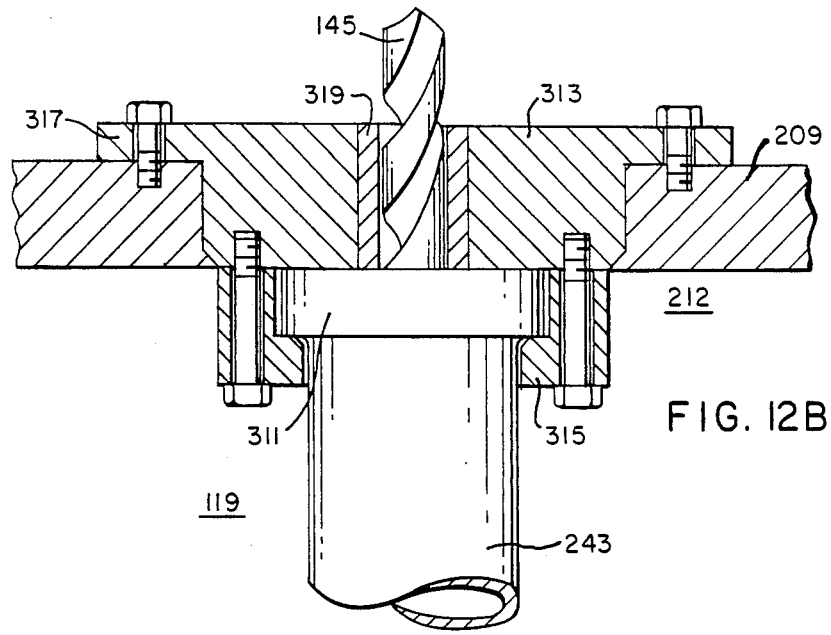
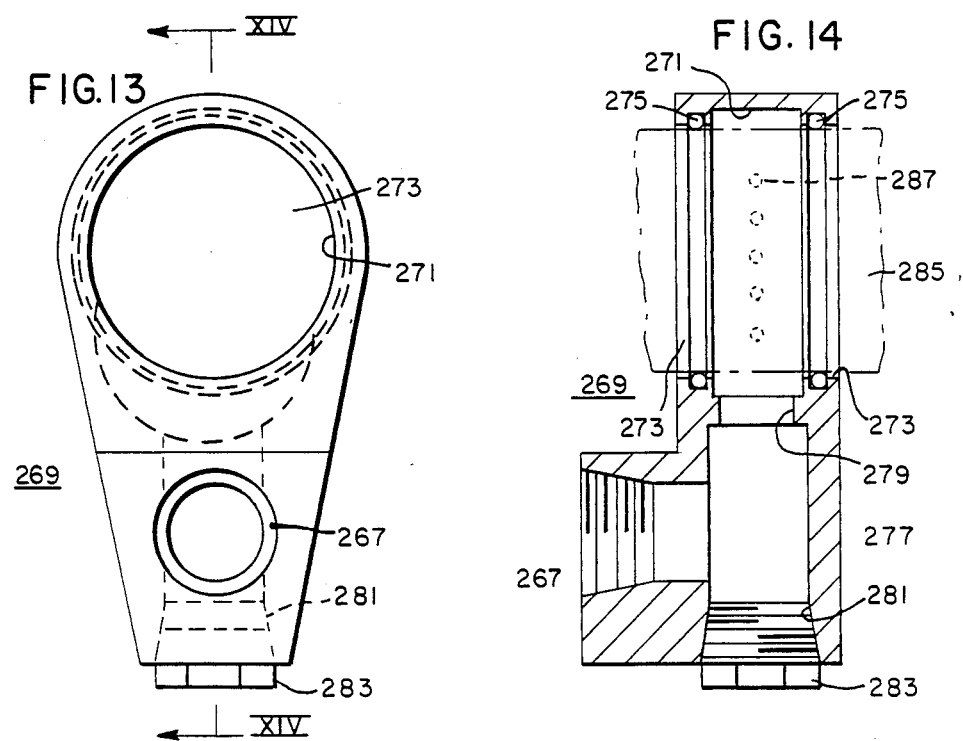

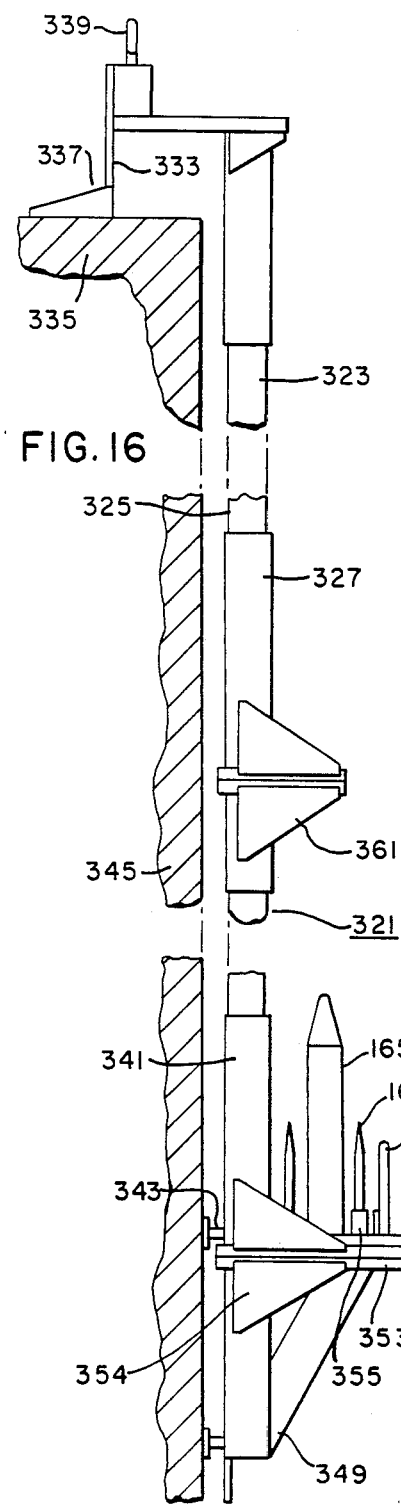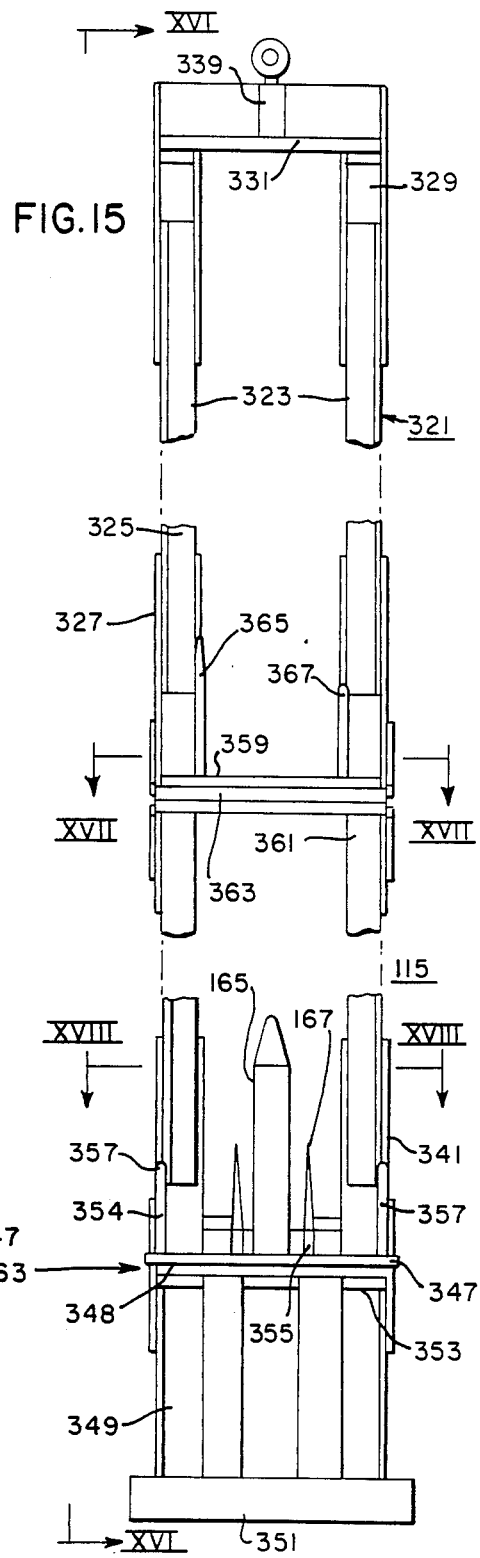

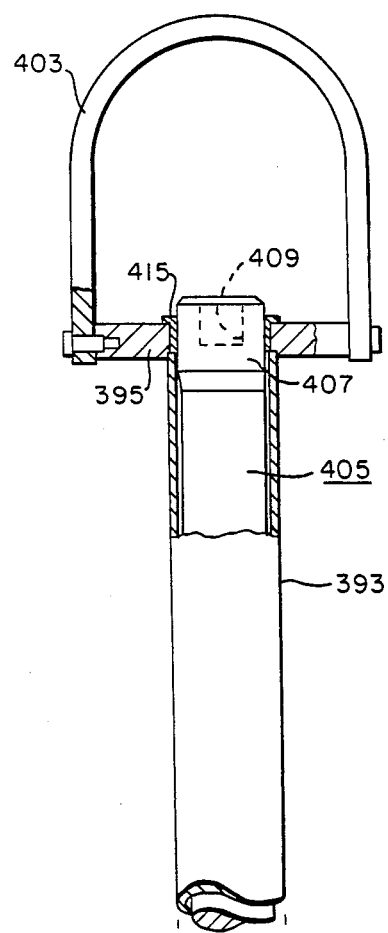
FIG. 21
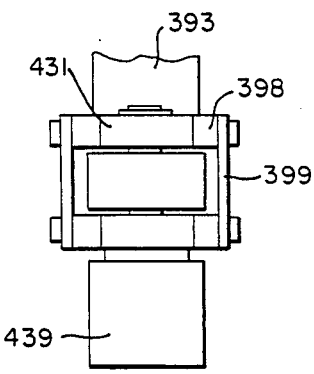
FIG. 22
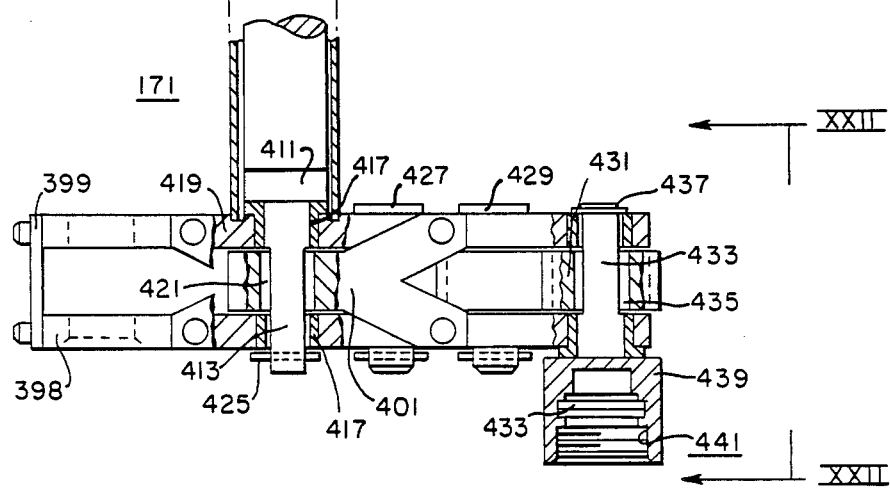

MANUAL REPLACEMENT OF OLD SPLIT-PIN ASSEMBLIES BY NEW SPLIT-PIN ASSEMBLIES

BACKGROUND OF THE INVENTION

This invention relates to nuclear reactors and it has particular relationship to the replacement of damaged old split-pin assemblies (OSPA's) by new split-pin assemblies (NSPA's). Split-pin assemblies are secured to the lower guide tubes (LGT's) of a nuclear reactor. The bifurcated ends, i.e., the tines, of each split pin engage in holes in the upper core support plate supporting the associated guide tube.

The guide tubes to which the OSPA's are secured typically include a lower section or lower guide tube (LGT) and an upper section or upper guide tube. The LGT and the upper guide tube are secured together coaxially by abutting flanges which are bolted together. In some guide tubes the LGT includes a lower flanged section and an upper flanged section joined axially by bolts through the flanges. The LGT has a lowermost flange having counterbores spaced circumferentially by 180° in which OSPA's are secured.

Application Ser. No. 617,857 filed June 6, 1984 to Calfo et al. for *Replacement of Split Pins in Guide Tubes* assigned to Westinghouse Electric Corporation and the related applications referred to in Calfo et al. disclose an automatic system including robotic tooling for replacing OSPA's by NSPA's. This process has proven highly useful in situations where the split pins on all guide tubes (typically 37 to 61) of a reactor are to be replaced. Typically, the automatic system is conveyed to the site of the replacement by seven trailers and several weeks are consumed in a replacement.

The damage to an OSPA is typically a crack in the old pin. Sonic apparatus is available to determine if there is a crack in an OSPA so that replacement by an NSPA is required. Typically the use of this apparatus uncovered cracks in the OSPA's of some of the guide tubes; the OSPA's in the other guide tubes were crack free. In such cases, it is only necessary to replace the defective OSPA's and the complexity, time consumed and cost involved in the use of the automatic system outweighs its benefits.

It is an object of this invention to provide a method and apparatus (tooling) less complicated and costly than the above-described automatic system for replacing OSPA's by NSPA's, particularly when a limited number of guide tubes are to be processed but also having more general use in situations where all split-pin assemblies are to be replaced.

SUMMARY OF THE INVENTION

In accordance with this invention, there are provided, for complete replacement of an OSPA by and NSPA, a saw-and-drill stand, an installation stand, unique runner-and-torque tools and a unique crimping tool. The saw-and-drill and the installation stand are suspended from the wall of the refueling pool of the nuclear reactor plant at a depth of about 20 feet of water. The runner and torque tools and the crimping tool are long-handled tools which are manipulated from a platform above the pool to perform their functions on OSPA's and NSPA's on the respective stands. There are also long-handled auxiliary tools such as clamps or grippers for removing the fragments of an OSPA from the saw-and-drill stand, a tool for releasing the flange fragment of the OSPA from the guide tube flange, and a tool for positioning the NSPA in the installation stand.

The saw-and-drill stand includes a rotary saw of abrasive material such as tungsten carbide and a drill. The guide tube with the OSPA's secured to it is mounted in the saw-and-drill stand so that it can be rotated. Each OSPA is severed by the saw into a pin fragment and a second fragment. The pin fragment is the part of the pin which extends below the under surface of the guide tube flange. This fragment is severed without damage to the guide tube and is separated from the guide tube. The second fragment includes the flange of the OSPA and the remainder of the pin and the nut secured to it. The second fragment remains secured to the flange of the guide tube. The drill is spaced by a predetermined angle, circumferentially from the saw. Where there are two diametrically positioned OSPA's in the guide tube, this angle is 180°. The drill is oriented so that its bit may be advanced generally vertically into the second fragment. The bit has a diameter slightly greater than, or approximately equal to, the diameter of the shank of the old split pin. To remove the second fragment, the guide tube is rotated through the circumferential angle so that the drill bit is generally coaxial with the remainder of the old pin of the second fragment. The drill bit is advanced into the second fragment separating the second fragment into a third fragment including predominantly the flange of the pin and a fourth fragment including the remainder of the pin with the nut secured to it. Where the guide tube has two pins, the above-described process is then carried out on the second pin.

The guide tube sans the OSPA's is then moved to the installation stand. This stand has facilities for mounting a new split pin. Such facilities are shown in FIG. 25 of application Ser. No. 617,854 filed June 6, 1984 to Nee et al. for *Replacement of Split-Pin Assemblies in Nuclear Reactor* and assigned to Westinghouse Electric Corporation. The guide tube sans the OSPA's is mounted on the installation stand with the lower counterbores in its flanges coaxial with the new split pin and with the flanges of the new split pins to be engaged with the bases of the lower counterbores. The new nut is then threaded onto each pin by the long-handled runner and is secured with a predetermined measured limited torque by the long-handled extension torque tool. The cup extending from each new nut is then crimped to the new pin to complete the installation of the NSPA's.

A significant feature of the runner is that its socket is connected through a gear train to the long rod handle which is turned to thread a new nut onto a new split pin. The necessary offset between the handle and the socket is thus provided.

A measured torque is impressed near the upper end of the long-rod handle of the torque wrench to torque the new nut onto the new pin. The socket of the torque wrench is connected to the rod by an offset arm, but the arm is so short compared to the rod that the measured torque is substantially equal to the torque applied to the new nut.

The crimper tool is characterized by fixed jaws with tapered cam surfaces. The crimping is produced by moving the jaws downwardly generally parallel to flutes in the new split pin.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which:

FIG. 2 is a view partly in section and partly in side elevation of an old split-pin assembly secured to the flange of an LGT;

FIG. 3 is a view partly in longitudinal section and partly in side elevation showing a new split-pin assembly positioned in the flange of a guide before the cup extending from the new nut is crimped to the new split pin;

FIG. 4 is a view in side elevation of the new split pin of a new split-pin assembly;

FIG. 5 is a diagrammatic view showing a refueling pool including a work station in which an OSPA is replaced by an NSPA;

FIG. 12B is a fragmental view partly in section and partly in side elevation showing the manner in which the drill assembly is secured to the saw-and-drill stand;

FIG. 13 is a view in side elevation showing the exhaust manifold of the drill assembly shown in FIG. 12;

FIG. 14 is a view in section taken along line XIV—XIV of FIG. 13;

FIG. 15 is a view in side elevation of the installation stand of the station shown in FIG. 5;

FIG. 16 is a view in end elevation taken in the direction XVI—XVI of FIG. 15;

FIG. 21 is a view partly in side elevation and partly in longitudinal section showing the offset runner for threading the new nut onto the new split pin;

FIG. 22 is a fragmental view in side elevation taken in the direction XXII—XXII of FIG. 21 showing the socket of the torque tool;

Figure 23:
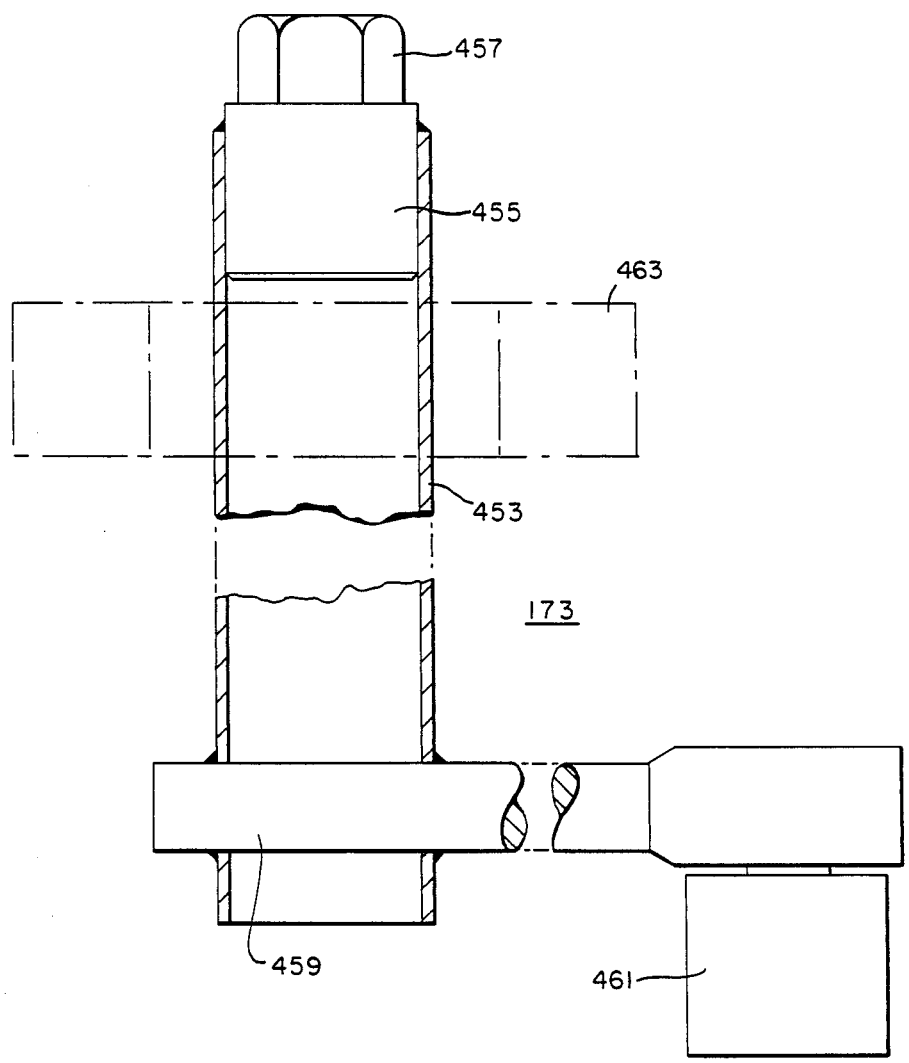
FIG. 23 is a view partly in longitudinal section and partly in side elevation showing the extension torque tool for tightening the new nut onto the new pin.
Figure 23A:
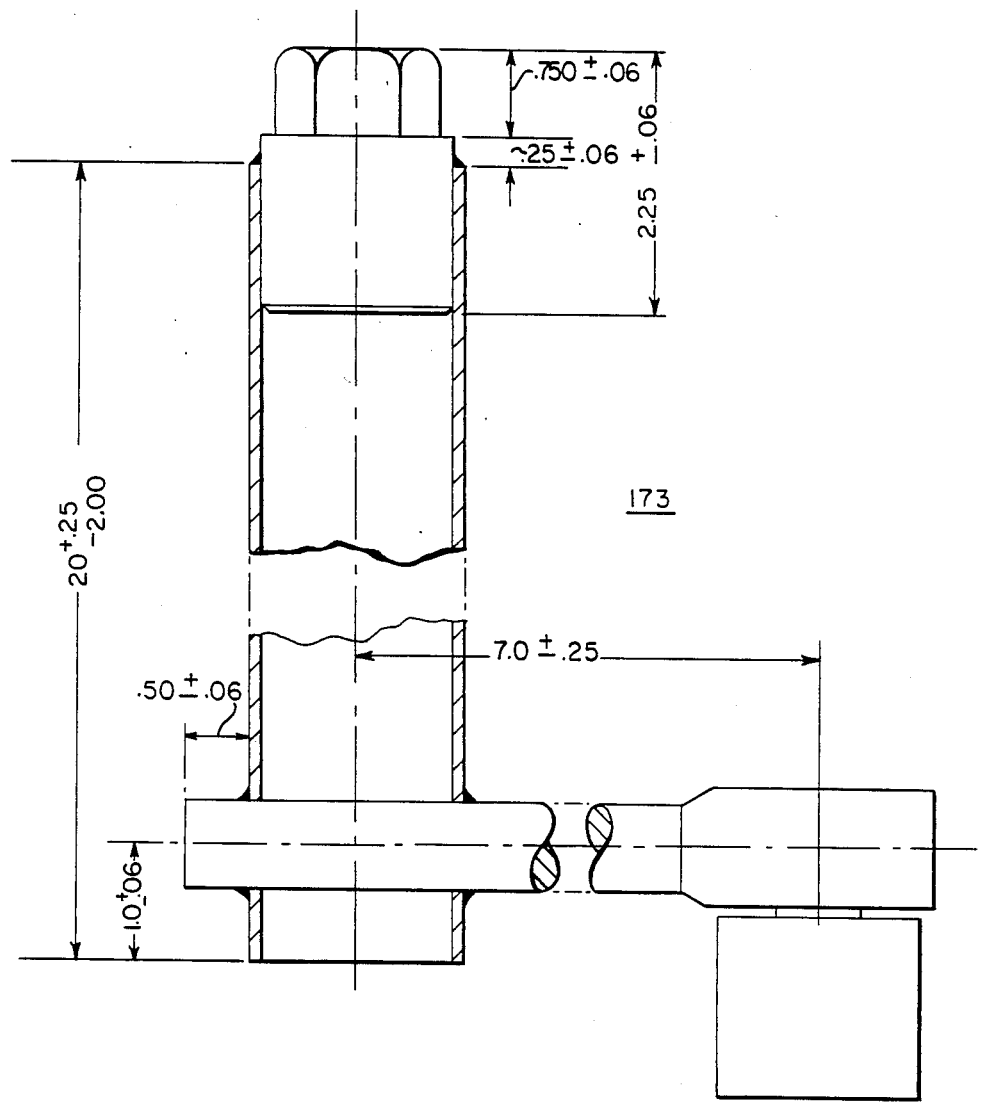
FIG. 23A is a view similar to FIG. 23 but showing the dimensions of a typical extension torque tool.

The dimensions of FIG. 23A are included only for the purpose of aiding those skilled in the art in practicing this invention and not to limit this invention.

DETAILED DESCRIPTION OF EMBODIMENT AND PRACTICE OF THE INVENTION

Figure 1:
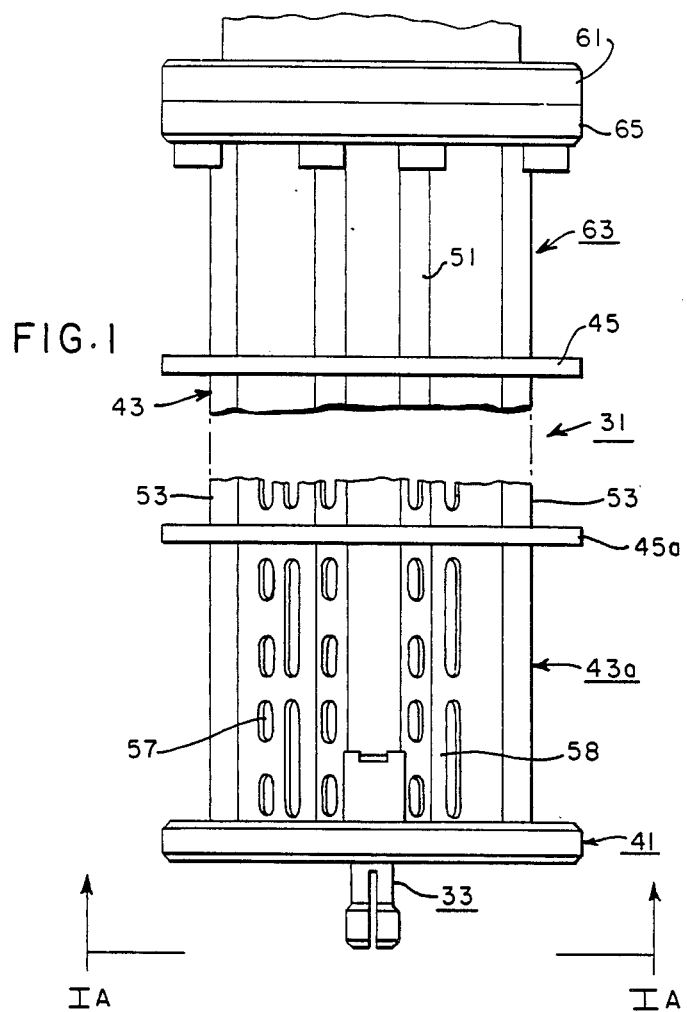
FIG. 1 is a fragmentary view in side elevation showing predominantly the lower section of the lower guide tube (LGT); split-pin assemblies are secured to the lowermost flange of this section.
Figure 1A:
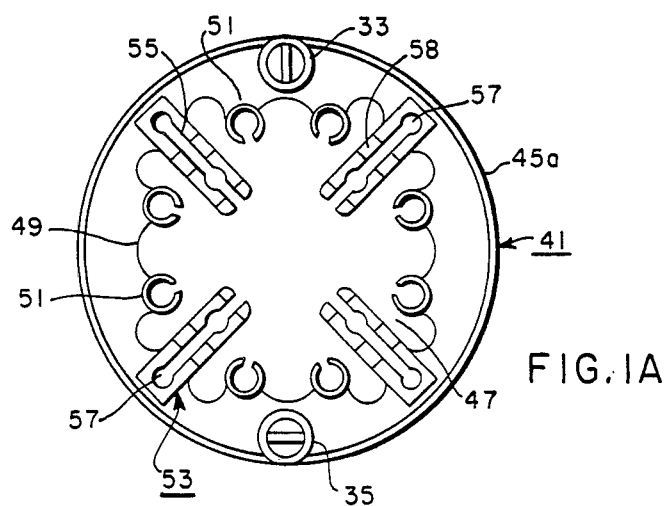
FIG. 1A is a plan view of the bottom of the guide tube taken in the direction of IA—IA.

FIGS. 1 and 1A show predominantly the lower section 31 of an LGT including old split-pin assemblies 33 and 35 which are to be replaced. The pins 33 and 35 are spaced diametrically in counterbores 37 and 39 (FIG. 2) of the flange 41 of the section 31. The lower section 31 includes a plurality of sheaths 43 secured together by cards 45. The cards 45 have coextensive openings 47 (FIG. 1A), each opening having a boundary 49 whose envelope is of generally square shape. Each sheath 43 includes a plurality of tubes 51 of generally transverse C section whose openings are in communication with opening 47. The tubes 51 accommodate control rods (not shown). The arms of the spider (not shown) from which the control rods radiate pass through the lateral opening in the tubes 51. Control-rod guides 53 are mounted in the corners of the boundary 51. Each guide 53 has a transverse slot 55 in communication with opening 47. Each slot has longitudinal arcuate expansions 56 intermediate the ends and 57 near the outer ends for accommodating control rods (not shown). The tubes 51 and the guides 53 have longitudinal slots 58 for passing the coolant. The lowermost sheath 43a is connected between the lowermost card 45a and the flange 41. The upper section 63 of the LGT has a flange 65 bolted to the flange 61 of the upper guide-tube section. The uppermost sheath 43b is connected between the uppermost card 45 and the upper flange 65 of section 63. The intervening sheaths are connected between cards 45.

Each OSPA 33-35 (FIG. 2) includes an old split pin 71 having a thread 73 at one end and a bifurcated tip or tires 75 at the opposite end. A flange 77 is interposed between the thread 73 and the tip 75 extending from a shank 79 connected to the threaded end. Each OSPA 33-35 is secured in the top and bottom counterbores 37 and 39 of the flange 41 by an old nut 80 with the flange 77 engaging the base of the bottom counterbore 39 and the old nut threaded onto the thread 73 and in engagement with the base of the top counterbore. Rotation of the old nut relative to the old pin is prevented by a locking device 81 of T section which engages a slot (not shown) in the top of pin 71. The locking device is secured by a pin 82 which passes through the nut 73 and is welded to the cross member of the locking device 81. In use, the outer surfaces of the tines of the tip 75 grip the surface of a hole in the upper core support (not shown in FIG. 2).

Figure 4A:
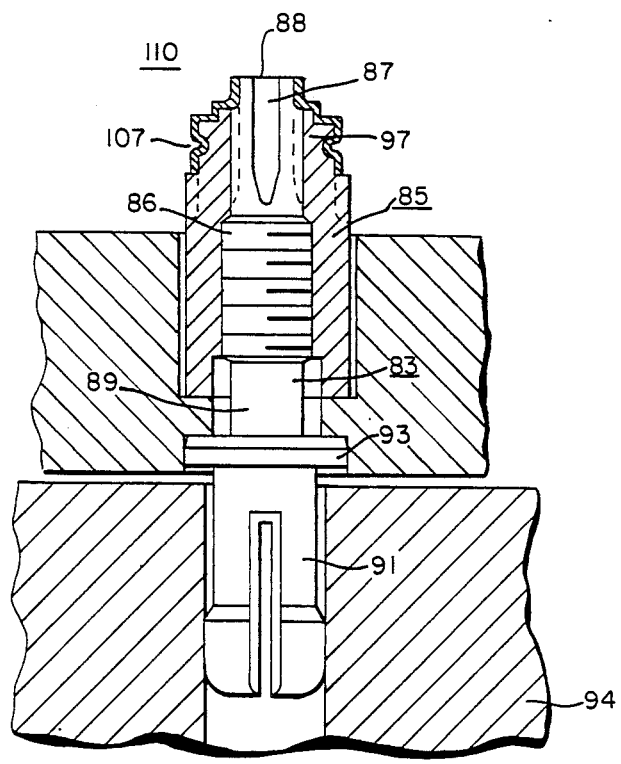
FIG. 4A is a view in longitudinal section of the NSPA as mounted in the guide tube and inserted in the upper core plate.

The NSPA 84 (FIG. 3) in its state prior to crimping includes a new pin 83 (FIGS. 3, 4) and a new nut 85. The new pin 83 has near one end a thread 86 which is interposed between a stem 87 having elongated grooves or flutes 88 and a shank 89. The centers of the flutes 88 are spaced by 90° around the stem 87. The opposite end 91 of the new pin is bifurcated. A flange 93 is interposed between the end 91 and the shank 89. The new nut 85 includes an internally threaded section 95 from which a cylindrical head 97 extends. The head 97 has circular grooves or notches 99. Secured to the head 97 of the new nut 85 is a cup 101 (FIG. 3) having a shoulder 103 from which a skirt 105 extends. The cup 101 is pre-crimped to the head by indentations 107 which engage the grooves 99 in the head. As shown in FIG. 4A in the completed NSPA 110, the cup 101 is crimped into the flutes 88 in the new pin 83. Also shown in FIG. 4A is a part of the upper core plate 94 of the reactor. The tines of the new split pin 83 extend into a hole in the core plate 94 gripping the wall of the hole.

In the replacement of the OSPA's 33-35 by NSPA's 110, each OSPA is broken up into fragments and removed from the LGT. The new split pins 83 are then placed on knife edges or blades on a plate of an installation tool and the guide tube is positioned on the plate with its counterbores 37, 39 in registry with the new split pin and the flange 93 of each new split pin in engagement with, or positioned to be raised into engagement with, the base of the lower counterbore 39. The new nuts 85 are then torqued onto the new split pins 83 by a runner and a torque wrench. The cups 101 are then crimped into pairs of opposite flutes 88 in the stems of the split pins.

Figure 6A:
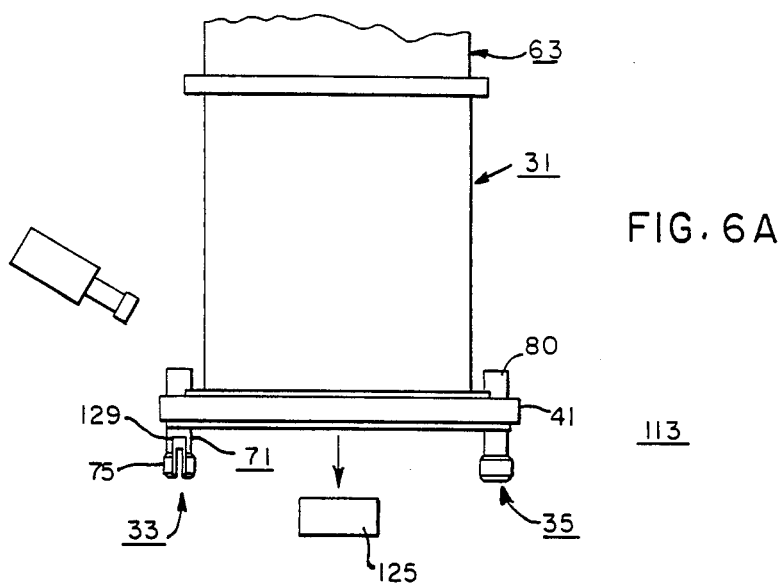
FIGS. 6A through 6N are fragmented diagrammatic views illustrating the progression followed in a complete replacement of an OSPA by an NSPA in the practice of this invention.
Figure 6B:
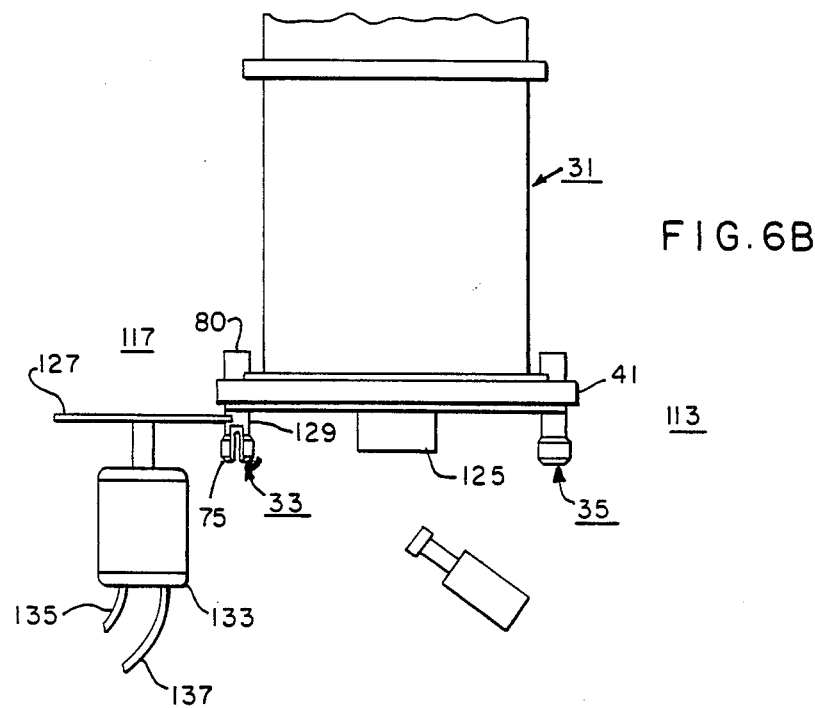

As shown in FIG. 5, the replacement of the OSPA's 33-35 by the NSPA's is accomplished in a refueling pool 111 at a depth of about 20 feet of water. An OSPA removal stand 113 and an NSPA installation stand 115 are suspended vertically typically from a wall of the pool in position so that they can perform the removal and replacement. The removal stand 113 includes a saw assembly 117 and a drill 119. The installation stand 115 includes a fixture 121 appropriately equipped for the installation. FIGS. 6A through 6N show the processing of guide tube having diametrically mounted OSPA's 33 and 35 for the removal of the OSPA's. Only the lower section 31 and part of the upper section 63 of the LGT are shown but these sections are to be taken to represent the complete guide tube. The guide tube is removed from the reactor by a crane (not shown), which engages a bail (not shown) in the top of the guide tube, and transported to the OSPA removal stand 113 (FIG. 6A) where it is suspended on blocks 125 with OSPA positioned so as to be engaged by the saw 127 of the saw assembly 117 (FIG. 6B) at or above the crotch 129 (FIGS. 2, 6B) where the tines join. Preferably, the saw should not be aligned transversely with the region where the tines are separated. This positioning is to be avoided because it is undesirable that the saw should encounter the gap between the tines. Under appropriate circumstances, it may be feasible or even desirable to sever the old pin 71 along the tines. The saw 127 is driven by an air motor 133. The air is supplied through a hose 135 connected to a compressor (not shown) on the platform (not shown) above the refueling pool 111. The air is exhausted above the pool through an air hose 137. The saw assembly 117 is pivotal in and out of engagement with the old pin 71 of the old split-pin assembly so as to free the cutting region from chips. The old pin 71 is completely severed, breaking up the OSPA into a pin fragment 141 and a second fragment 143 including the flange 77 and old nut 80 (FIG. 7B) with the remainder of the old pin attached to it. The second fragment remains in the counterbores 37 and 39 of the flange 41.

Figure 6C:
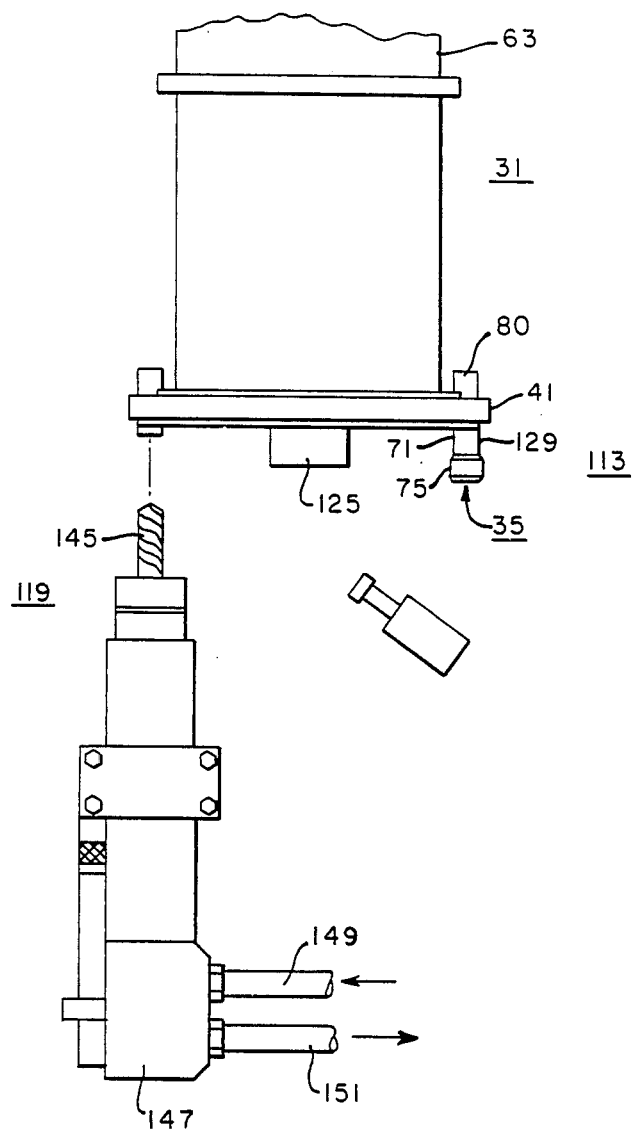
Figure 6D:
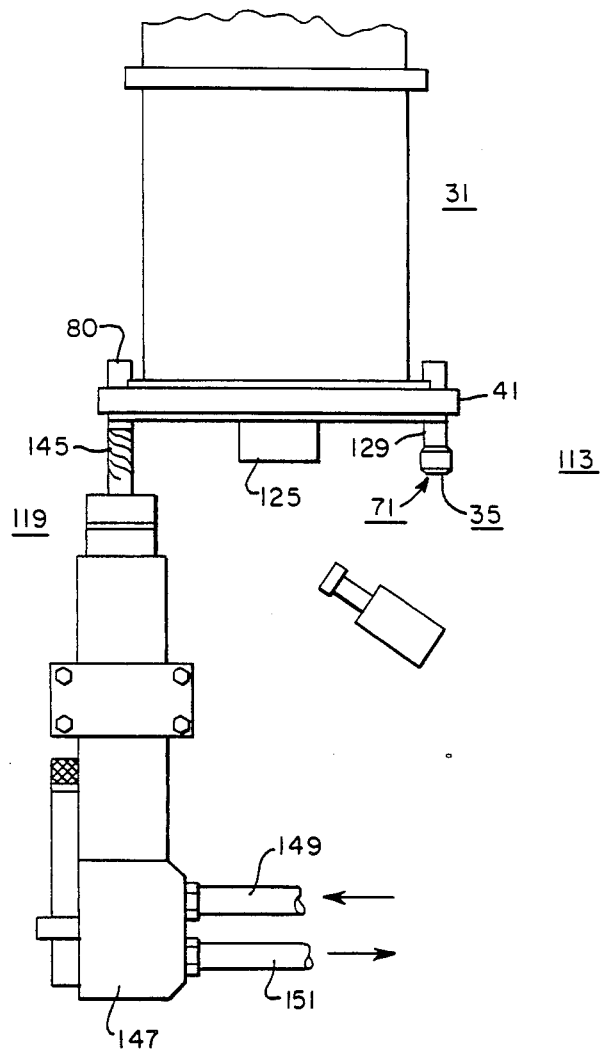
Figure 7A:
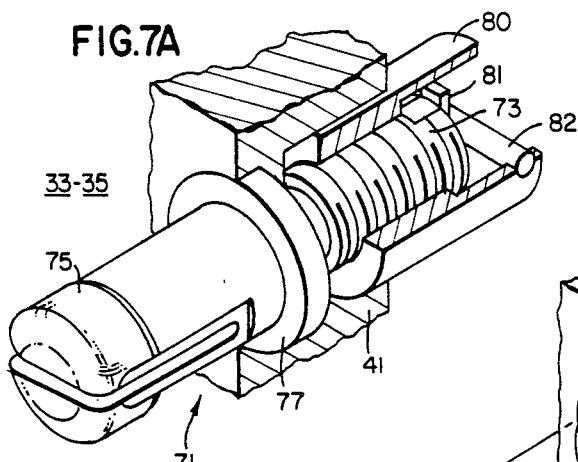
FIGS. 7A through 7D are a series of views in isometric showing the progression followed in the removal of an OSPA from the flange of an LGT in the practice of this invention.

The guide tube (31-63) is next rotated 180° positioning OSPA 35 to be engaged by the saw 127 and the second fragment 143 of the OSPA 33 coaxially with the bit 145 of the drill 119 (FIG. 6C). The bit 145 has a diameter approximately equal to or greater than the diameter of the shank 79 of the old split pin 71. The drill is driven by an air motor 147. Air is supplied to the motor 147 by hose 149 from a compressor (not shown) on the platform over the pool 111 and the exhaust is transmitted through a hose 151 to the region above the pool. The bit 145 is driven into the second fragment 143 axially (FIGS. 6D, 7C) breaking the second fragment up into a third fragment 153 (FIG. 7D) including predominantly the flange 77 and a fourth fragment 155 including the remainder of the old pin 71 and the old nut 80. The fragments 141, 153, 155 of OSPA 33 are removed.

Figure 7B:
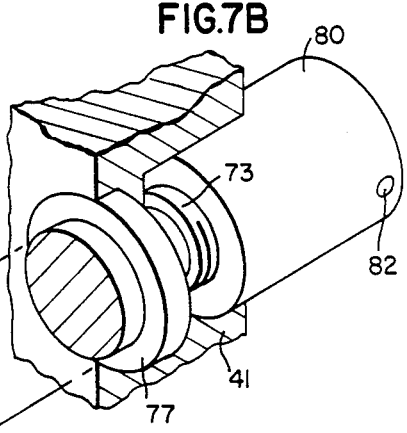
Figure 7C:
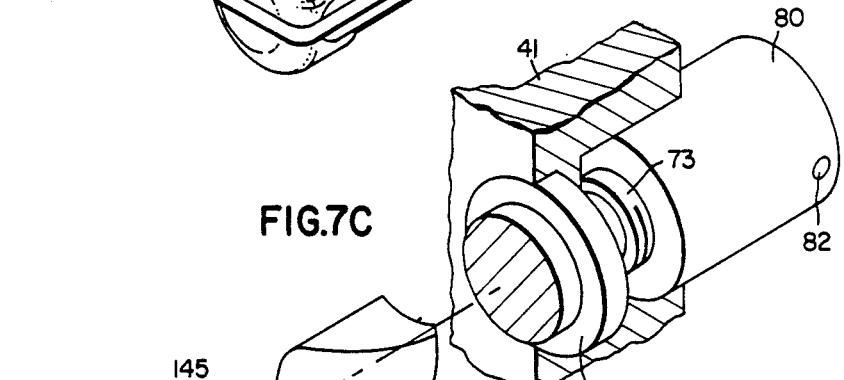
Figure 7D:
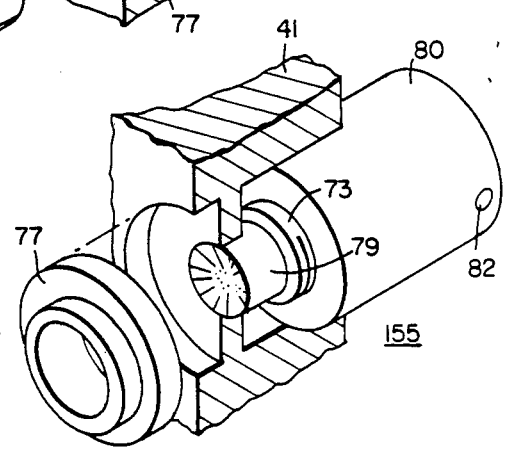
Figure 8:
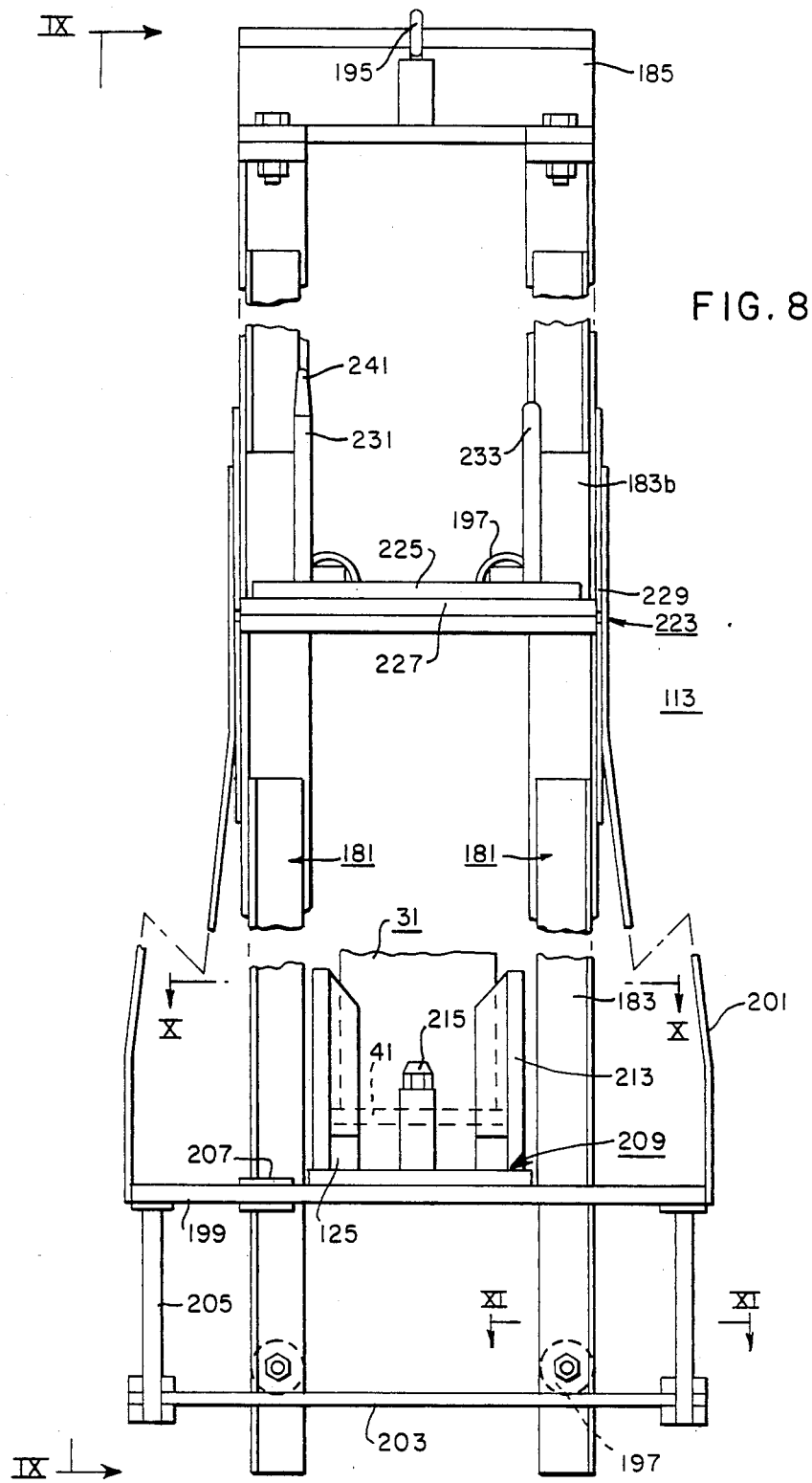
FIG. 8 is a view in side elevation showing the saw-and-drill stand of the station shown in FIG. 5.

The saw 127 now severs the old split pin 71 of the second OSPA 35 into a pin fragment 141 and a second fragment 143 (FIGS. 6E, 7B). The guide tube (61-63) is rotated through 180° and the drill 119 is operated to break up the second fragment 143 into a third fragment 153 and fourth fragment 155 (FIGS. 6F, 7D). The fragments 141, 153 and 155 of OSPA 35 are removed.

Figure 6G:
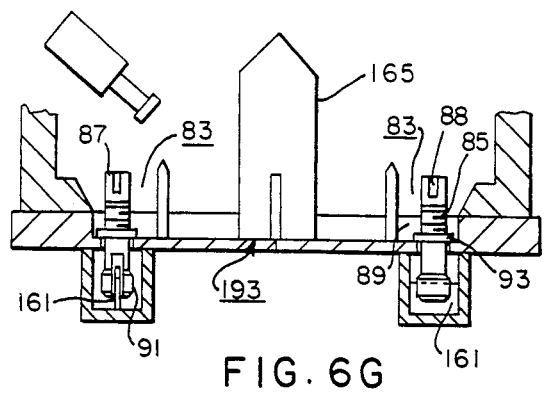
Figure 6H:
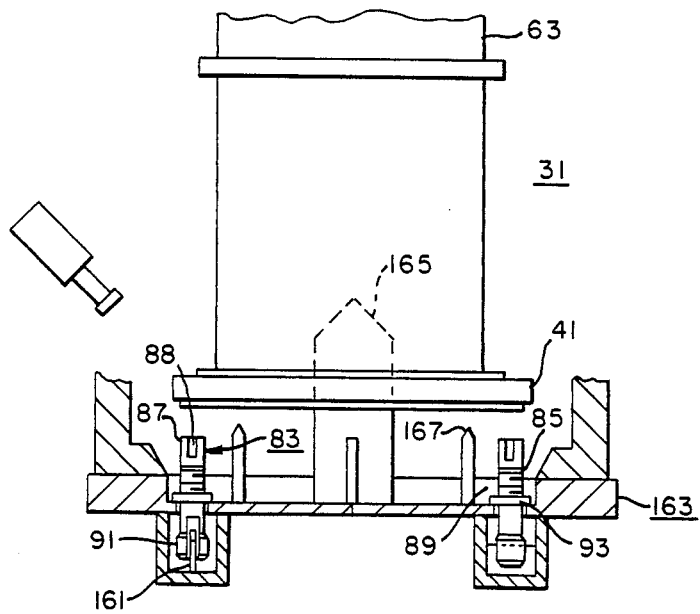
Figure 6I:
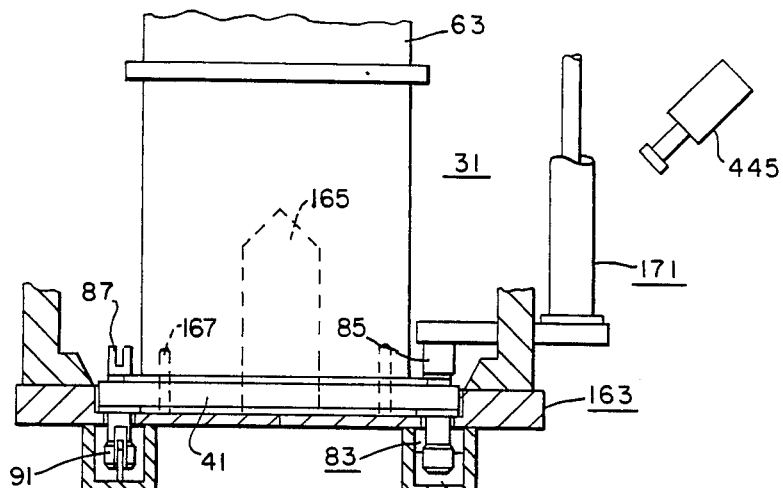
Figure 6J:
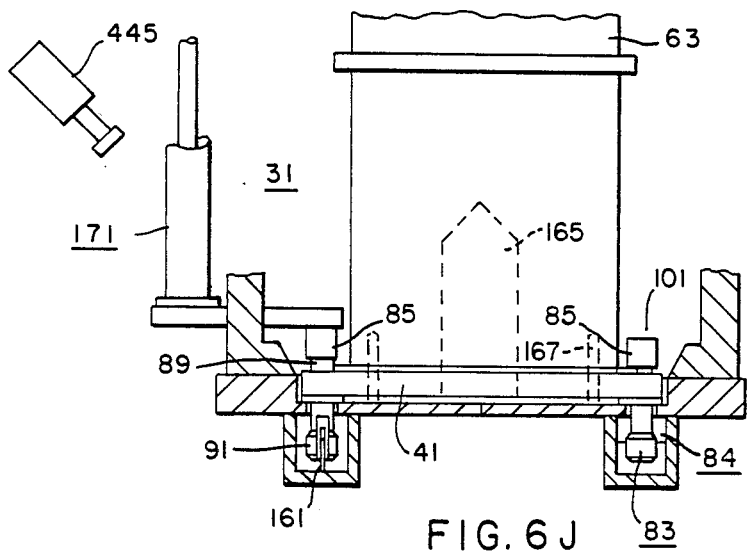
Figure 6K:
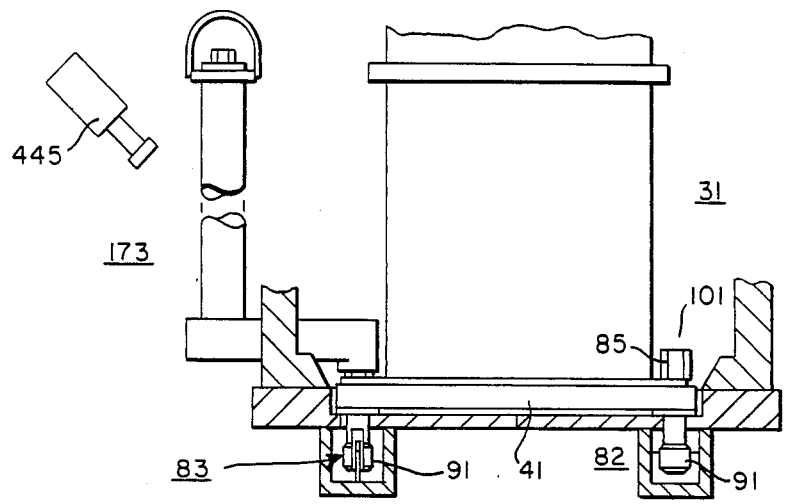
Figure 6L:
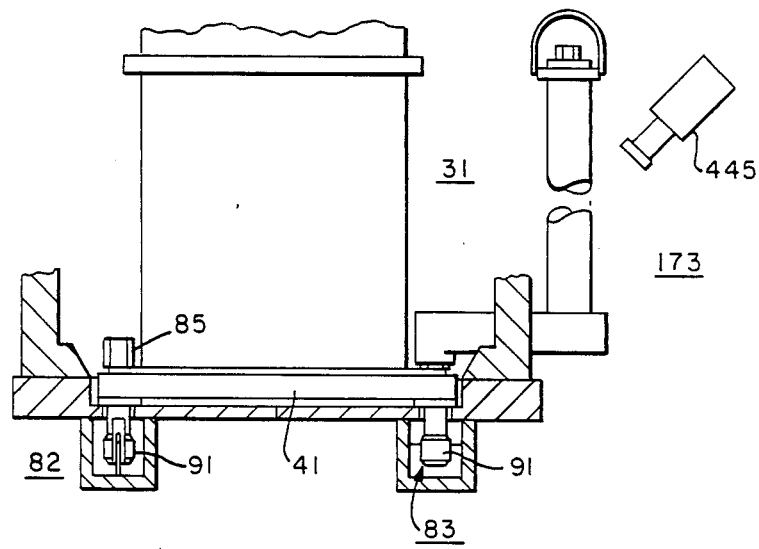
Figure 6M:
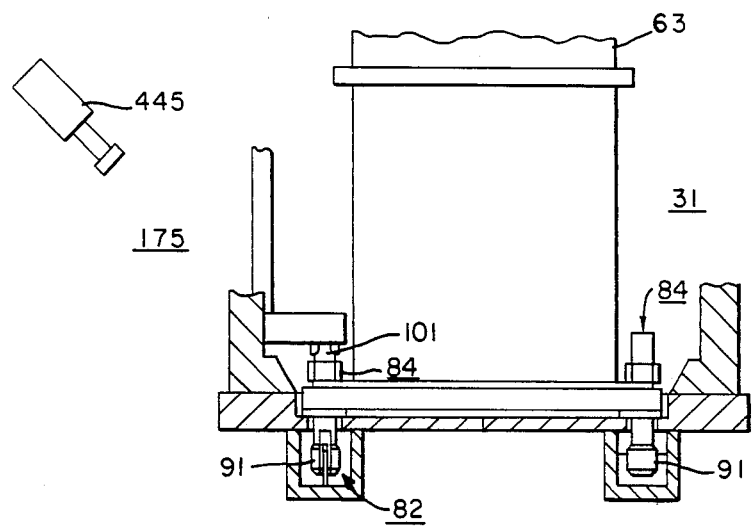
Figure 6N:
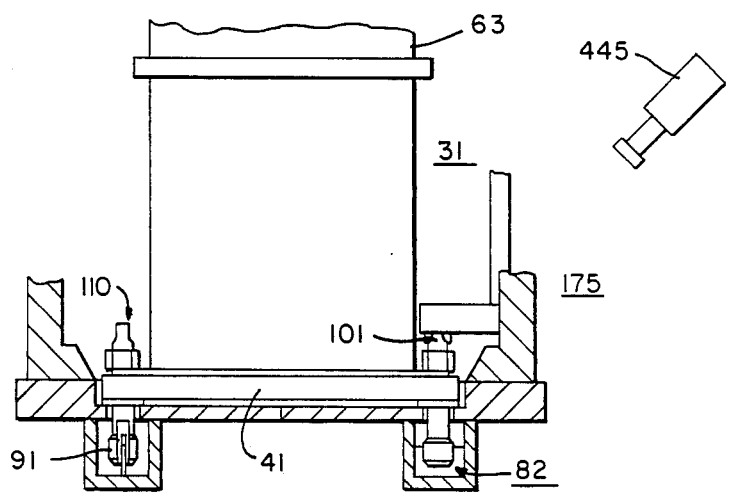

Each new split pin 83 is now threaded onto the end of a long-handled rod (not shown) on the platform of the pool 111 and is positioned on a knife edge 161 on the platform 163 of the installation stand 115 with the tines of the bifurcated tip 91 bridging the knife edge (FIG. 6G). The long-handled rod is then unscrewed from each new split pin 83. The guide tube (31-63) is positioned on the platform with the fluted tip 87, the threaded section 85 and the shank 89 (FIG. 4) of each extending into the top counterbore 37 and the flange 93 abutting the base of the bottom counterbore 39 (FIGS. 6H, 6I). The guide tube is appropriately positioned by pin 165 which extends through opening 47 (FIG. 1A) and pins 167 which extend through opposite expanded openings 57. A new nut 85 is threaded onto each new split pin by nut runner 171 (FIGS. 6I, 6J). Each new nut 85 is secured to the new split pin 83 by applying a predetermined measured torque with a torque wrench 173 (FIGS. 6K, 6L). The locking cup 101 of each new nut 85 is crimped to the flutes 88 in each new split pin by a crimper 175 (FIGS. 6M, 6N).

The saw-and-drill stand 113 is shown in its specific aspects in FIGS. 8 through 14. The stand 113 includes a pair of elongated vertical supports 181 (FIGS. 8, 9) each formed of a plurality of coextensive overlapping angles or extensions 183 secured together by bolts. The supports 181 are suspended from an angle plate 185. The angle plate is secured to a vertical plate 189 anchored in a corner 191 of a wall 193 of the pool. The angle plate 185 carries an eyebolt 195 for manipulating the stand 113. Pads 197 are bolted to certain of the angles 183 and engage the wall 193. The pads 197 are so preadjusted that the supports 181 extend vertically along the wall.

The stand 113 includes a baseplate 199. The baseplate 199 is generally C-shaped with the web 200 of the C inwardly with respect to supports 181. The baseplate 199 is rigidly supported by a strut formed of straps 201, support 203 and braces 205. The straps 201 are suspended from angles 183. The support 203 is secured to an extension 206 from the lowermost angle 183a and the braces 205 are secured between support 203 and baseplate 199. The baseplate is also secured to projections 207 extending from the lowermost angles 183a.

Figure 9:
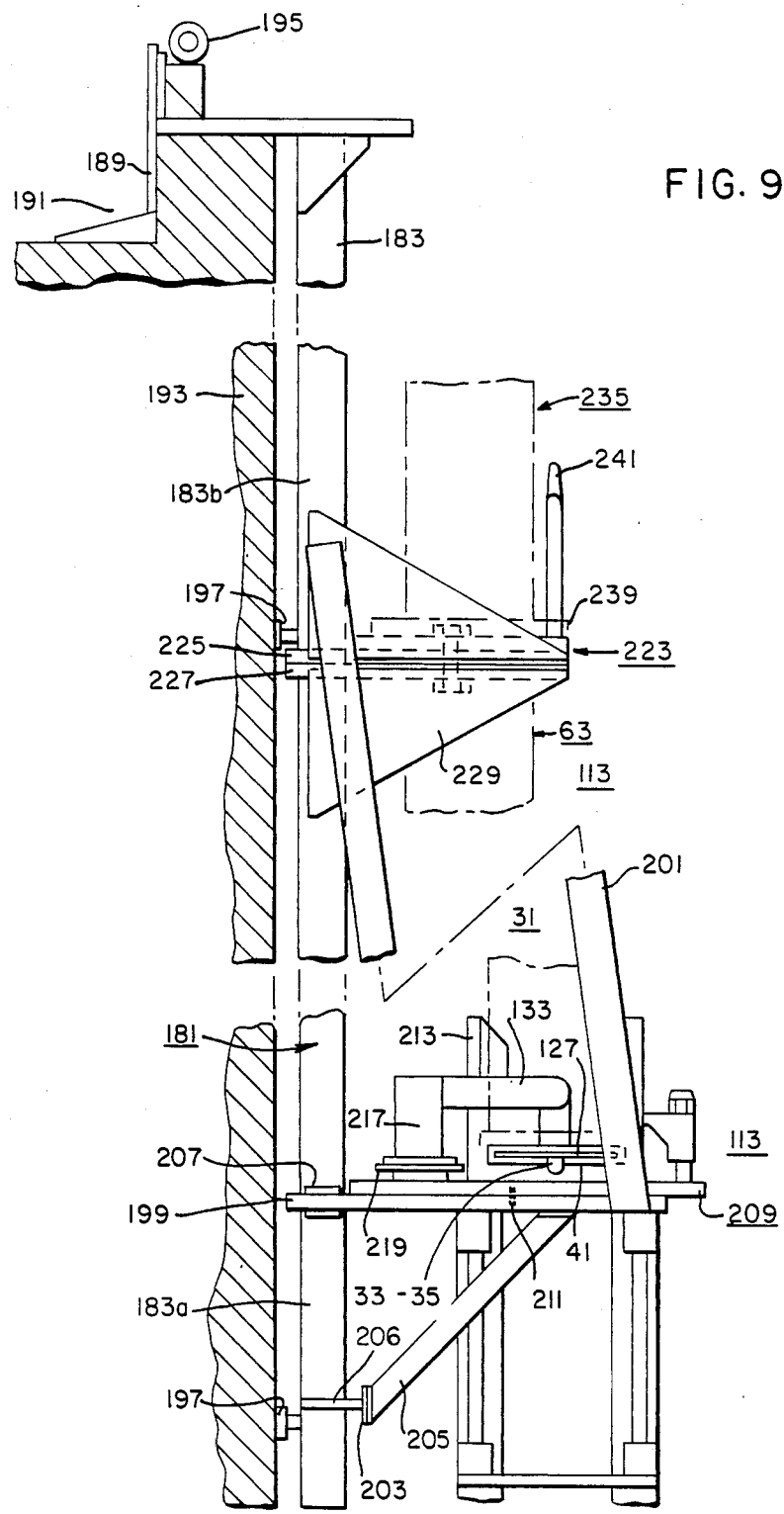
FIG. 9 is a view in end elevation taken in the direction IX—IX of FIG. 8.
Figure 10:
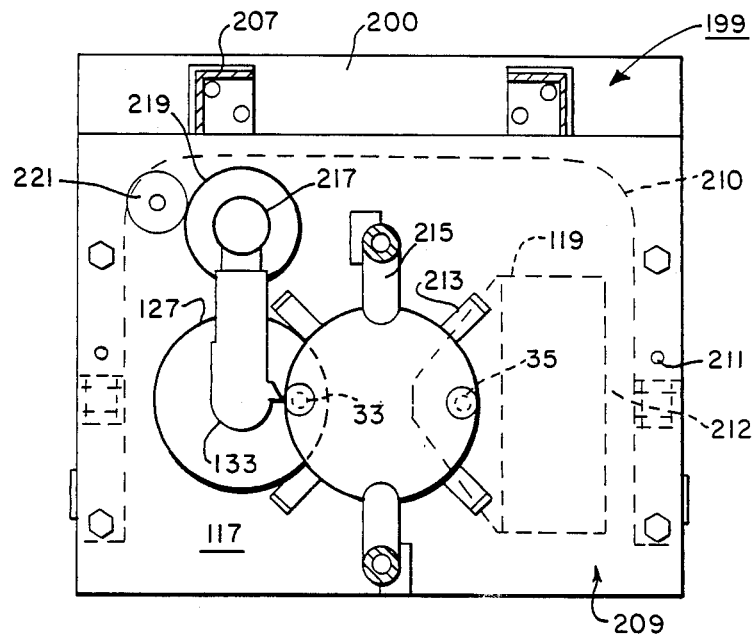
FIG. 10 is a view in section taken along line X—X of FIG. 8.
Figure 11:
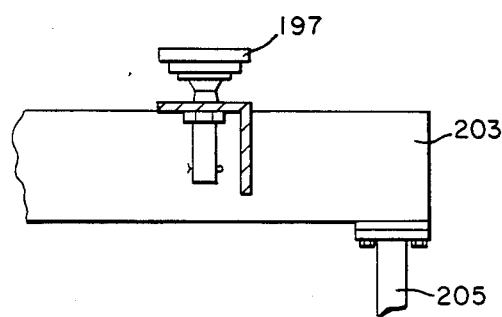
FIG. 11 is a fragmental view in section taken along line XI—XI of FIG. 8.

A fixture 209 is supported on a three-sided frame 210 bounding the opening 212 (FIG. 10) in the baseplate 199. The fixture 209 is positioned on the baseplate by dowel pins 211 and is bolted to the baseplate. The fixture 209 carries the blocks 125 (FIGS. 6B, 8) on which the flange 41 of the guide tube (31-63) is disposed. Vertical guides 213 extend upwardly from the blocks 125. The fixture 209 has oppositely disposed clamps 215 for firmly securing the guide tube. The guide tube is so oriented on blocks 125 that the clamps engage the flange 41 of the guide tube at positions displaced circumferentially by about 90° from each OSPA 33 and 35. The saw 127 and its drive 133 are suspended as a unit from a shaft 217 extending vertically from the fixture 209 (FIGS. 9, 10). The shaft 217 carries a gear 219 which is rotatable by a pinion 211. The pinion is rotatable by a long arm (not shown) from the platform (not shown) over the pool 111. By rotating the pinion 221 the saw 127 may be pivoted so as to permit removal of the chips.

A baseplate assembly 223 is mounted on angles 183b at an upper level of the support 181. The assembly 223 includes a baseplate 225 and a pair of supporting plates 227 which are secured to brackets 229 extending from the end sides of the angles 183b. The baseplates 225 and the supporting plates 227 are bolted together. At its outer end, the baseplate 225 carries pins 231 and 233. FIG. 9 shows a fragmentary diagrammatic view of the guide tube as a whole including the upper guide tube 235 as well as the LGT (31-63). The upper guide tube 235 and the LGT (31-63) are joined by a flange 239 (FIG. 9) which has holes to receive the pins 231 and 233 so that the overall guide tube (31-63-235) is in proper position for processing. The pin 231 has a bullet-shaped tip 241 and is longer than pin 233 to facilitate mounting of the guide tube.

Figure 12:
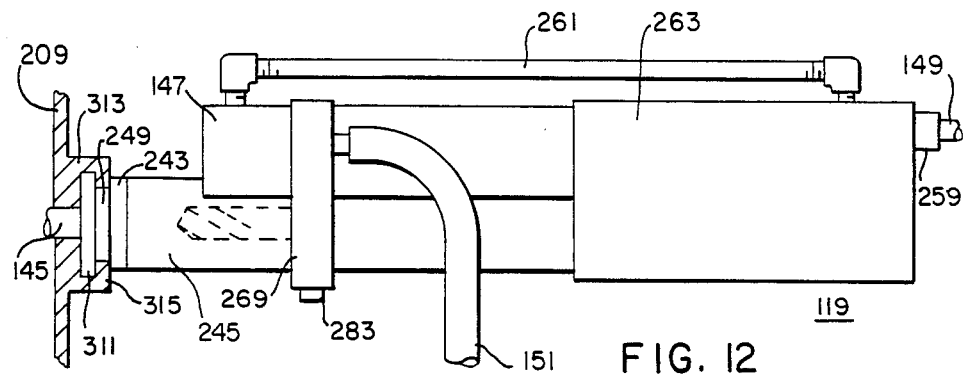
FIG. 12 is a view in side elevation showing the drill assembly of the saw-and-drill stand shown in FIGS. 8 through 11.
Figure 12A:
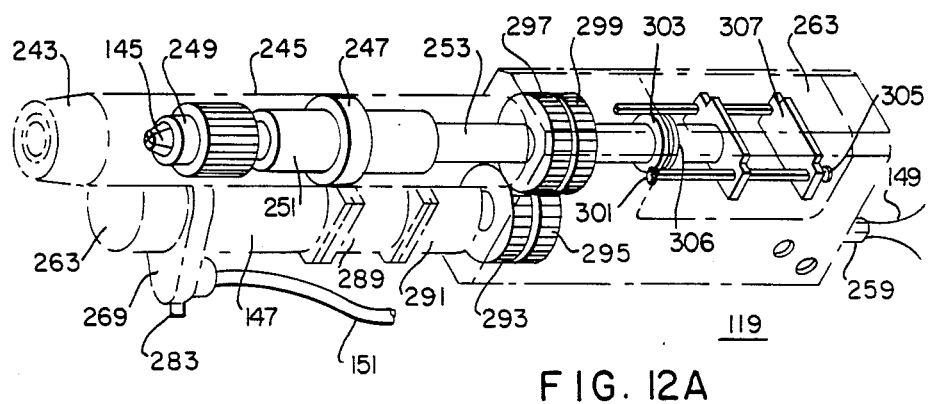
FIG. 12A is a diagrammatic view in isometric showing the operational mechanisms of the drill assembly.
Figure 17:
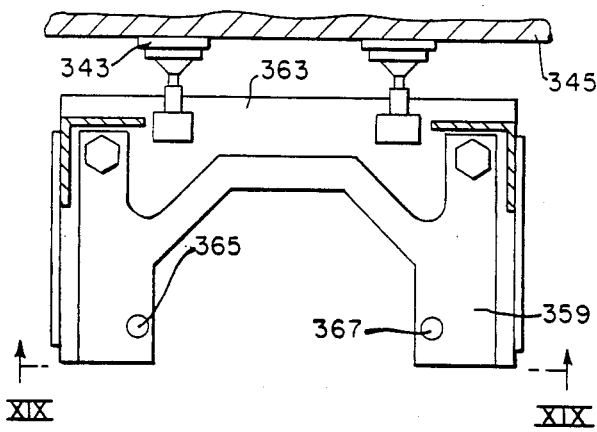
FIG. 17 is a view in transverse section taken along line XVII—XVII of FIG. 15.

The drill 119 (FIGS. 12, 12A, 13, 14) has a nosepiece 243 extending from a bearing housing 245 including a bearing 247. The chuck 249 carrying the bit 145 extends from a drive adapter 251 which is connected to a threaded drive shaft 253 movable forward and backward and rotatable in the bearing 247 as the shaft is driven. To drive the shaft, the air motor 147 (FIGS. 6C, 12A) is provided. The air motor 147 is supplied through pipe 261 from a compressor (not shown) on the platform above pool 111 through hose 149 connected to a nipple 259. The pipe 261 communicates with the nipple in a chamber 263, containing the control valves for the motor. The pipe 261 is connected to the motor chamber containing the turbine (not shown) of the motor. The air is exhausted to the region above the pool 111 through a hose 151 (FIGS. 6C, 12) connected to the outlet 267 (FIGS. 13, 14) of an exhaust manifold 269. The exhaust manifold 269 is a member of generally L longitudinal cross section. Within the leg of the L there is a generally cylindrical chamber 271 communicating with cylindrical openings 273. Bounding each opening 273, there is a peripheral groove within which there is an O-ring 275. The outlet 267 extends through the foot of the L and communicates with chamber 271 through a grooved generally cylindrical region 277 and a neck 279. The opening through which the grooves 279 were machined has a threaded boundary 281 and is sealed by a plug 283. The part 285 of the motor 255 which contains the turbine (not shown) and has the exhaust holes 287, extends onto the chamber 271 through the O-rings 275 (FIG. 14). The chamber 271 is sealed pressure tight by the O-rings so that the exhaust air can only flow out through outlet 267 whence it is exhausted to the region above the pool 111.

The motor shaft (not shown) is connected through reduction gears 289 and 291 (FIG. 12A) to drive gears 293 and 295. Drive gear 293 meshes with gear 297 to rotate the shaft 253 and through the shaft the bit 145. Drive gear 295 meshes with gear 299. Gear 299 meshes with the thread on shaft 253 and advances or retracts the bit 145 depending on the direction of rotation of the motor shaft. The housing 263 contains a forward-stroke control valve 301 which, reverses the direction of rotation of the turbine of motor 255 on engaging stop 303 when the bit 145 is advanced, and back-stroke control valve 305 which reverses the direction of rotation of the turbine, when the bit 145 is retracted, by engaging stop 307. The nuts 306 and the engaging stop 303 serve to adjust forward-reverse motions.

The drill 119 is secured firmly to the fixture plate 209 through the opening 212 in baseplate 199 (FIGS. 10, 12B). A flange 311 is mounted about the chuck 249 of the drill. This flange 311 of the drill is held between an annular flanged member 313 above the flange 311 and an annular retention member 315 below this flange. The flange 317 of the flanged member 313 is bolted to the top of fixture 209. The retention member 315 is bolted to the flanged member 313. There is a bushing 319 in member 313 through which the bit 145 passes.

The installation stand 115 (FIGS. 15–19) includes a support 321 formed of a plurality of sets 323 of coextensive angles 325 joined at their ends by plates 327. The sets 323 are suspended from angle supports 329 which are themselves suspended from a block 331 connected to a plate 333 anchored to a bracket 335 in the corner 337 of the wall of the pool 111. The block 331 carries an eyebolt 339. The plate 327 and a plate 341 at the lower ends of the angles 325 carry pads 343 which engage the adjacent wall 345 of the pool 111 and are preadjusted so that the support 321 is suspended vertically.

The fixture 163 includes a baseplate 347 supported on a plate 348 of generally C section. The plates 347 and 348 are supported by braces 349 extending from a pedestal 351. The braces 349 have cross plates or ears 353 upon which the plates 347 and 348 are stacked. The plates 347 and 348 and the cross plates 353 are bolted together. The plates 347 and 348 are anchored to the plates 341 of the vertical supports by triangular brackets 354.

Figure 18:
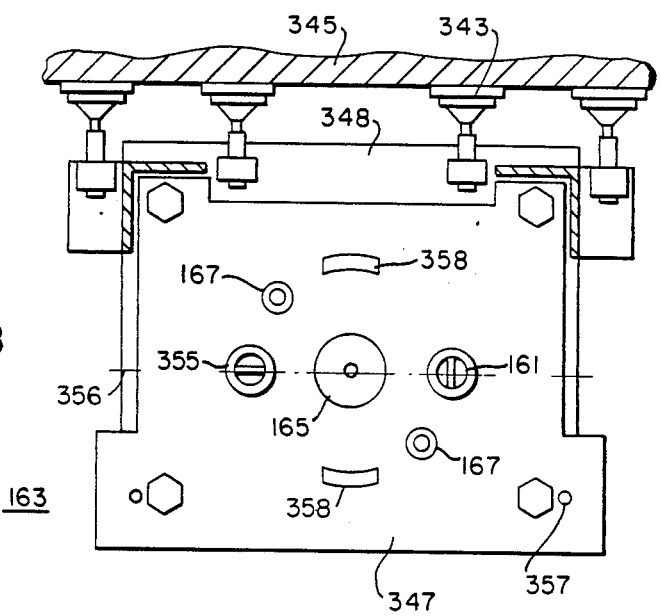
FIG. 18 is a view in transverse section enlarged taken along line XVIII—XVIII of FIG. 15.
Figure 19:
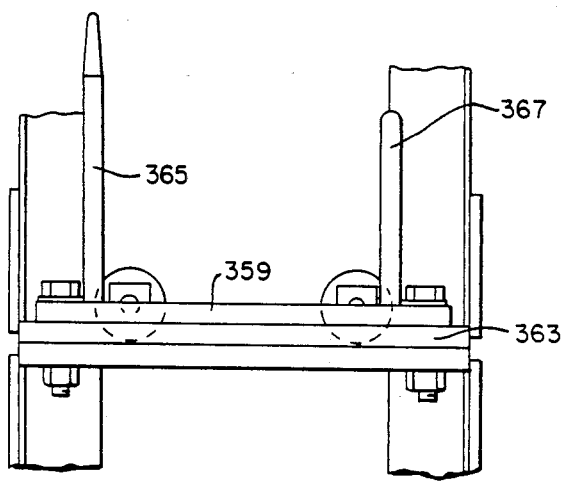
FIG. 19 is a fragmental view in end elevation taken in the direction XIX—XIX of FIG. 17.

Cups 355 (FIG. 18) extend from the plate 347 and are spaced symmetrically with respect to the center of the plate along the line 356 of the plate parallel to the wall of pool 111. Within each cup 355 the knife edge or blade 161 extends from the plate 347. The pin 165 extends from the center of plate 347 and the pins 167 extend from the plate 347 spaced symmetrically with respect to the center along a line at 45° to the center line 356. The pins 165 and 167 serve to position the guide tube (31-63-235) appropriately on the fixture support 163. The pin 165 extends through the center of the section 31 (FIG. 1A) of the guide tube. The pins 167 extend through oppositely diagonally disposed expansions 57 (FIG. 1A). Projections 358 extend from the surface of plate 347 (FIG. 18). The guide tube is positioned on these projections. When a guide tube is positioned on plate 347 with the pins 165 and 167 penetrating through the center and through the openings 57, its counterbores 39 (FIG. 2) extend over the blades 161 so that the new split pins placed on the blades pass through the other counterbores 37. The plate 347 is widened near the outer end and pins 357 extend from the ears resulting from the expanded width. These pins serve for positioning the mechanism of the crimping assembly 175 (FIG. 6M) for crimping the cups 101 onto the flutes 88 of the new split pins 83.

A guide plate 359 of generally C-section is suspended from the support 321 by brackets 361 of triangular shape connected to joining plate 327. The guide plate 359 is mounted on baseplates 363. The plates 359 and 363 are dowelled and bolted together. The inner edge of the guide plate 359 is shaped to accommodate the guide tube (31, 63, 235). The guide plate 359 carries pins 365 and 367. These pins, like the pins 231 and 233 (FIGS. 8, 9) of the saw-and-drill stand 113, pass through holes in the flange 239 joining the upper guide tube 235 and the LGT (31-63).

In the use of the installation stand 115, each new split pin 83 (FIG. 4) is positioned on the plate 347 with its tines (end 91) straddling the knife edge 161 and its flange 93 engaging the upper surface of cup 355. The mounting and torquing of the nut 85 (FIG. 3) and the crimping of the cup 101 onto the flutes 88 in the pin is then carried out. These and other operations demand auxiliary tools which will now be described.

Figure 20:
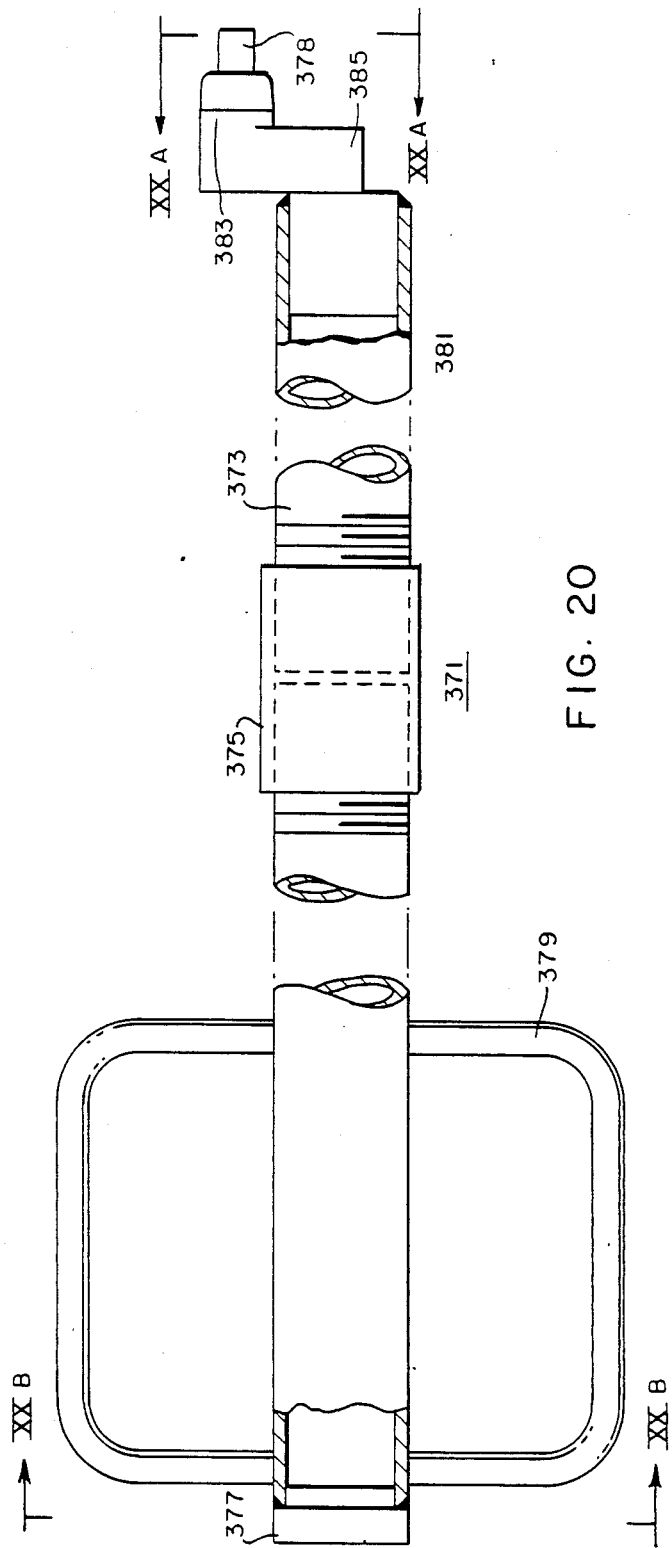
FIG. 20 is a view partly in side elevation and over a short length in longitudinal section of the punch tool for releasing the flange fragment of the old split-pin assembly from the lower counterbore of the LGT.
Figure 20A:
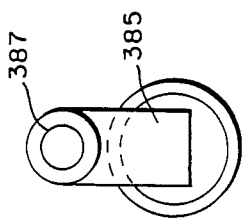
FIG. 20A is a view in end elevation taken in the direction XXA—XXA of FIG. 20.
Figure 20B:
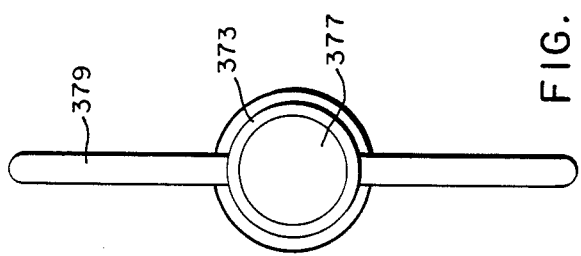
FIG. 20B is a view in end elevation taken in the direction XXB—XXB of FIG. 20.

It has been found that after the fragment 143 (FIG. 7C) of the old split-pin assembly 71 (FIG. 7A) is broken up by the drill 119 into the flange fragment 153 (FIG. 7D) and the pin-and-nut fragment 155, the flange fragment adheres to the base of the counterbore 39. To remove the flange fragment, the punch 371 shown in FIGS. 20, 20A, 20B is provided. Punch 371 is a long-handled tool capable of being operated from the platform above pool 111. The punch includes a long rod composed of pipe sections 373 joined by threaded sleeves 375. A plug 377 is welded to the upper end of the uppermost section 373 when the tool is in use (reversed with respect to FIG. 20). This section also carries a handle 379. A plug 381 is also welded to the lower end of the lowermost section 373. This plug carries a generally L-shaped member whose foot is a stud 383 integral with the leg 385. The stud 383 terminates in a pin 387. In use, the tool 371 is inserted in the pool 111 with the member 383-385 at the level of the flange 41 of the guide tube (FIGS. 1, 1A, 2). Since the pin 387 is offset with respect to the rod it is readily inserted in the upper counterbore 37. By manipulation of the handle 379, the flange fragment 153 is struck and released.

FIGS. 21 and 22 show the runner 171 for threading the new nut 85 on the thread 86 of the new split pin 83. This runner includes a cylindrical tube 393 extending between a plate 395 and the top of a skeletal member formed of plates or bars 398 interconnected by tie plates 399 at the ends and by tie plates 401 on the sides. A bail 403 is joined to the ends of plate 395. Within the tube 393 a cylindrical shaft 405 is rotatable. The shaft 405 is hollow but terminates at the upper end in a socket 407 having an internal hexagonal female receptacle 409 for a wrench. At the lower end, the shaft terminates in a flange 411 from which a pin 413 extends integrally forming a shoulder at the flange 411. The shaft 405 passes through a bearing 415 in plate 395 and the pin 413 passes through bearings 417 in plates 398. The shaft 405 is rotatable by a wrench (not shown) engaged in receptacle 409.

The shaft 405 drives a gear 419 through pin 413. The pin 413 is keyed to the hub of the gear 419 by keys 421. A roll pin 425 passes through the lower end of the pin 413. The gear 419 drives a train of gears 427, 429, 431. Typically, the gear ratio of the gears 419 and the gear 427 with which gear 419 meshes is one-to-one and the gear ratios between the other gears of the train is also one-to-one. A pin or stub shaft 433 is joined to the hub of the last gear 431 of the train by keys 435. A retaining ring 437 is in engagement with the top of pin 433.

The stub shaft 433 carries a socket 439 whose inner surface 441 is shaped to mate with the outer surface of the new nut 85 (FIG. 3). Inwardly, where the inner surface of the socket 439 is shaped to mate with the head 97 and the cup 101 of the new nut 85. The socket has grooves within which there are O-rings 443.

In the use of the runner 391, a new nut 85 is inserted in the socket 439 on the platform above the pool 111. The new nut is gripped and held securely by the O-rings 443. The runner 391 is then inserted in the pool 111 and the new nut is positioned over a selected new pin 83 on a knife edge 161 on the plate 348 of the installation stand 115 (FIG. 18) with the thread of the new nut in running engagement with the end of the thread 86 of the new pin 83. The positioning is facilitated by viewing the video screen (not shown) of a closed-circuit television system whose camera 445 is set to transmit a view of the top of the new pin (FIG. 6I). The new nut 85 is then threaded onto the thread 86 by rotating shaft 405 with a wrench. The rotation of shaft 405 rotates gear 419 in turn rotating gear 431 and socket 439 through the gear train. The new nut has grooves 446 (FIG. 3) (see also FIG. 3 Nee et al. supra) and the inner surface 441 of the socket 439 is shaped to mate with the grooves so that the threading is facilitated. After the new nut is threaded so that its inner end is in contact with the base of the upper counterbore 37 (FIG. 2) in flange 41, the runner 391 is separated from the new nut by pulling upwardly on the runner.

It is now necessary to torque the new nut 85 onto the new pin with a torque which must not exceed a predetermined magnitude. For this purpose the offset extension torque wrench 173 (FIGS. 23, 23A) is provided. The wrench 173 includes a long pipe 453 having a plug 455 with a hexagonal head 457 welded to its upper end. Near its lower end the pipe 453 is penetrated by an arm 459 which is welded to it. The arm 459 carries a socket 461 whose inner surface is shaped to mate with the outer surface of the new nut.

In the use of the torque wrench 173 the socket 461 is engaged with a new nut 85 threaded on a pin 83 by the runner 171 and is turned by applying a predetermined measured torque to the hexagonal head 457. The pipe 453 is maintained vertical by a fixture 463 including a block having a hole in which the pipe 453 is engaged. The torque is measured at the head 457 on the platform over the pool 111 but is applied through arm 459 since an offset is demanded. However, the arm is short compared to the length of the pipe 451 so that the actual torque applied to the new nut is substantially equal to the measured torque. Typically, as shown in FIG. 23A, the length of the pipe is 20 ft. and the distance between the axis of the pipe and the axis of the socket is 7 inches. The ratio of the length of the arm to the vertical length over which the torque is applied is only 7/240; the arm length is only 0.3% of the length of the pipe so that torque applied to the new nut 85 is for all practical purposes the same as the measured torque.

Figure 24A:
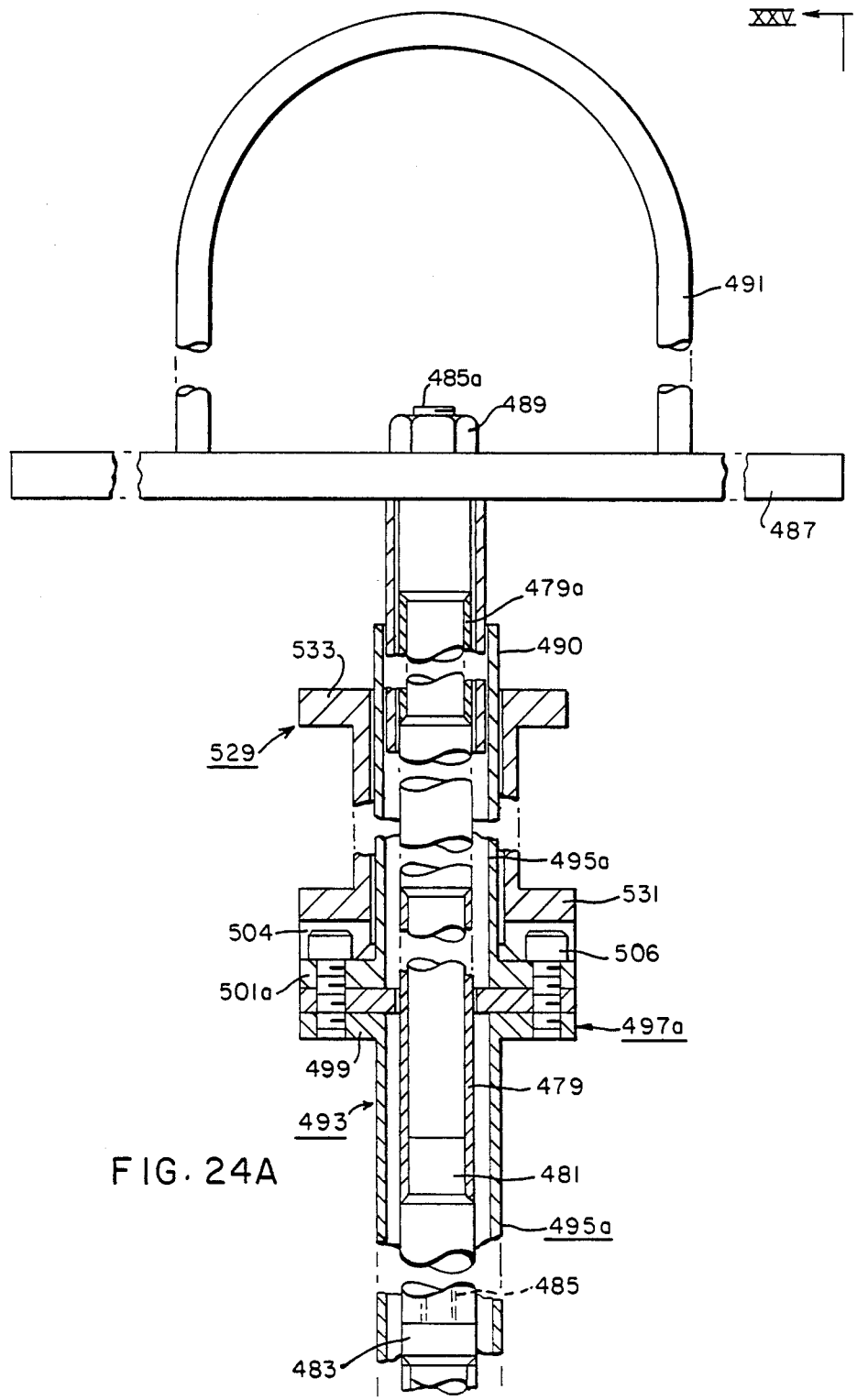
FIGS. 24A and 24B together constitute a view partly in side elevation and partly in longitudinal section showing the crimping tool assembly for crimping the cup on the new nut onto the new split pin to complete the mounting of an NSPA on a guide tube.
Figure 24B:
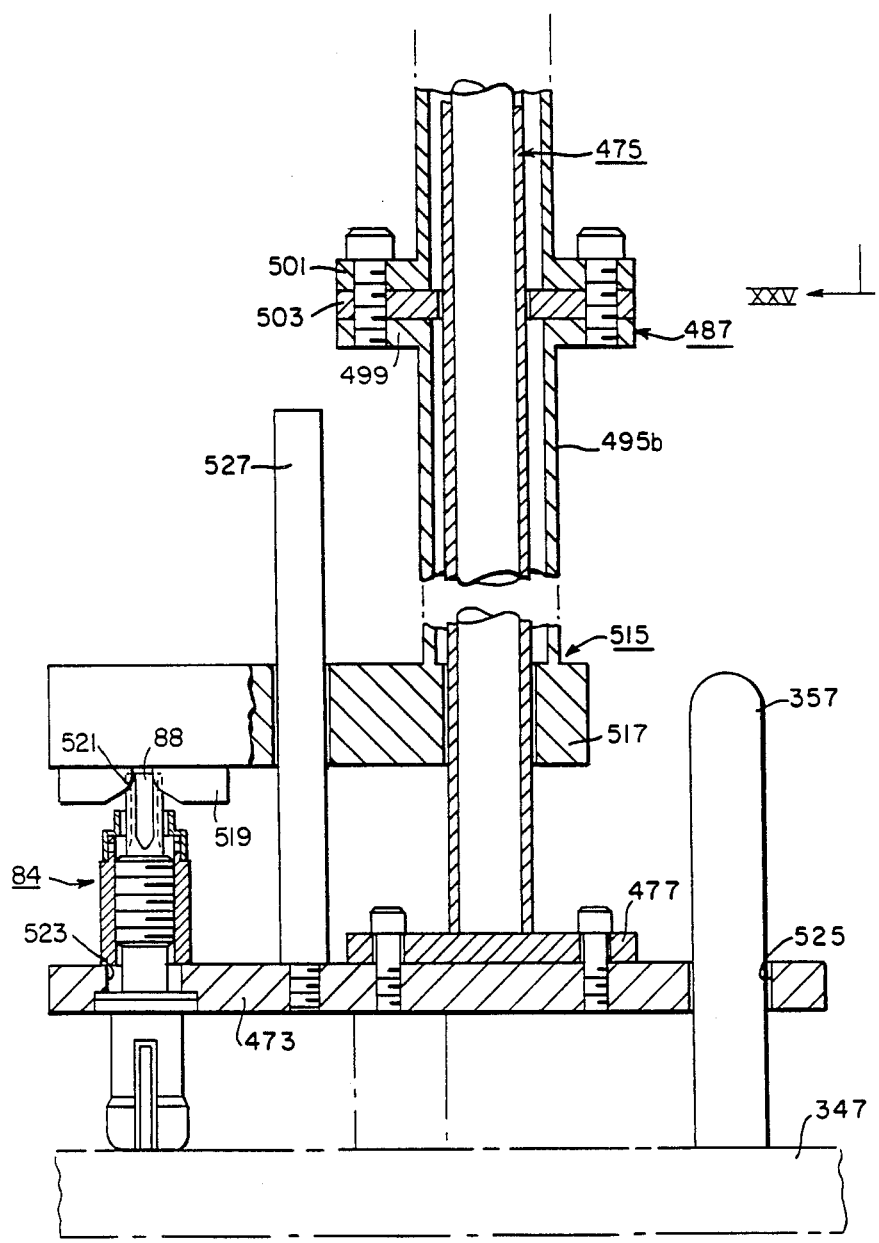
Figure 25:
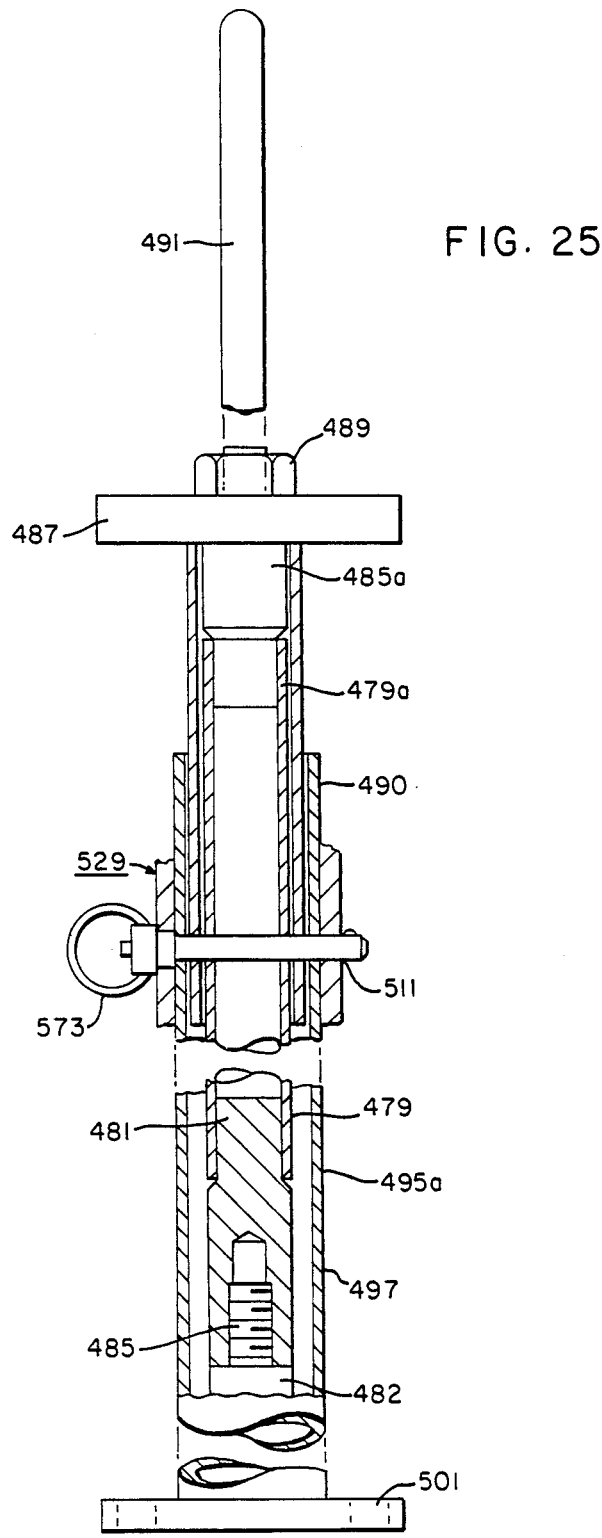
FIG. 25 is a view partly in longitudinal section and partly in side elevation of the upper part of the crimping tool assembly taken in the direction XXV—XXV of FIGS. 24A and 24B.

The crimping assembly or crimper 175 (FIGS. 24A, 24B) includes a baseplate 473 to be disposed on the flange 41 (FIG. 2) of a guide tube 123 in position on plate 347 of the installation stand 115 (FIGS. 15–19) for a crimping operation. An inner pipe 475 has a flange 477 at the bottom which is bolted centrally to the plate 473. The pipe 475 is composed of axial sections 479 firmly connected, at each junction between abutting sections, by a female adapter 481 (FIG. 24A), having a threaded opening, connected to one section and a male adapter 483 having a threaded stud 485 (FIG. 25). The stud is threaded into the threaded opening, connected to the abutting section. The uppermost section 479a has a threaded stud 485a. The stud 485a passes through an opening in a top plate 487 and is secured by a nut 489 to the top plate. Along a portion of its length the upper section 479a is passed through a sleeve 490 suspended from plate 487. A bail 491 is mounted on the top plate.

The crimper 175 also includes an outer cylindrical tube or pipe assembly 493 formed of sections or extensions 495 joined axially by couplings 497. Each coupling is composed of a flange 499 on one abutting section 495 and a flange 501 on the other and an annular bushing 503 interposed between the flanges 499 and 501. The flange 501a in the uppermost coupling 497a has an extended portion 504 which has slots to receive the bolts 506 that secure the flanges and bushing 503 together. The lengths and positioning of the sections 495 of the outer pipe assembly are such with respect to the inner pipe section 479 that the couplings 497 are interposed between adapter sets 481–483. The bushing 503 of each coupling 497 slideably engages the section 479 which is radially inwardly with respect to the bushing.

The upper section 479a of the inner pipe 475 and the upper section 495a of the outer pipe 493 have coaxial transverse holes near the top (FIG. 25). The holes are penetrated by a pin 511 having a ring 513 at its outer end. The pin 511, when in the holes, prevents the outer pipe from dropping downwardly. By pulling transversely on the ring 513 the pin may be pulled out. Thus, the pin 511 serves as a quick release for the outer pipe 493.

The lowermost section 495b of the outer pipe carries a crimping tool 515. The crimping tool 515 includes a plate 517 extending integrally near one end from the section 495b. At its opposite end the plate 517 carries oppositely disposed crimping jaws 519. The jaws 519 are fixedly secured, or extend integrally from, the lower surface of plate 517. The jaws 519 have oppositely disposed tapered cam surfaces 521 whose contour is so shaped such that when the jaws are moved downwardly in engagement with a cup 101 of a new nut 85, the cup is effectively crimped into oppositely flutes 88 of a new pin 83 to which the new nut is threaded (FIG. 4A, top). The base 473 has holes 523 and 525. The crimper 175 is positioned for a crimping operation with the base 473 on the flange 41 of the guide tube 123. The crimper is so positioned that the hole 523 in the base 473 extends over the new nut 85 of a new-nut-and-split-pin assembly 84 (FIG. 3) whose cup 101 is to be crimped into flutes 88 of a new pin, and the hole 525 penetrated by the adjacent pin 357 (FIG. 18) extending from plate 347. The assembly 84 is centered in hole 523 so that it is coaxial with the center line between the surfaces 521 of the jaws 519 and the surfaces just above or in contact with the end of cup 101. A guide pin 527 extends from base 473 and passes through a hole in arm 517. The guide pin serves to guide the crimping tool 515 as it is moved upwardly and downwardly.

The crimper 175 also includes a ram 529 which is of generally I-longitudinal cross section and is hollow encircling the upper section 495a of the pipe 493 near the top. The lower flange 531 of the ram 529 rests on the surface of extension 504 of the flange 501a of the upper coupling 497a in the standby condition of the crimper 175. The upper flange 533 of the ram 529 serves for operation of the ram.

In the use of the crimper 175, the crimper is positioned on the flange 41 of a guide tube (31-63-235) as disclosed above and as shown in FIG. 24. In the standby condition of the crimper 471, the ram 529 is positioned so that the flange 531 is seated on the upper section 504 of the flange 501a of the coupling 497a. The quick-release pin 511 is removed and while the outer pipe 493 is held, the ram 529 is separated from the upper section 504 of the flange 510a. The ram 529 is then released or thrust downwardly so that it strikes section 504a thrusting pipe 493 and tool 515 downwardly. Jaws 519 move downwardly so that the cup 101 of the new nut 85 is crimped into flutes 88 of the new pin 83. The ram is repeatedly raised and released or thrust a number of times so that the crimping operation is carried out effectively. The crimper 175 is then removed from the NSPA and positioned on the other split-pin and nut assembly. In this case, the base 473 is positioned so that the other new nut is centered in hole 523 and the other pin 357 is centered in hole 525. The second crimping operation is then completed. The processed guide tube is then returned to the reactor.

While the automatic tooling disclosed in Calfo et al. application (supra) operates highly successfully in situations in which the OSPA's in all or most guide tubes are to be replaced, the apparatus and method of this invention has marked advantages where only a few OSPA's are to be replaced by NSPA. The automatic tooling disclosed in Calfo et al. requires seven trailer trucks of equipment whereas this invention requires only one; the automatic tooling requires 30 to 50 minutes for complete separation (breakage) of the pin, and about 4 to 5 hours for complete removal of an OSPA and installation of an NSPA. The invention requires only 2 hours for removal of an OSPA and installation of an NSPA. This invention is much less costly than the automatic system.

While preferred practice and a preferred embodiment of the invention has been disclosed herein, many modifications thereof are feasible. This invention is not to be restricted except insofar as is necessitated by the spirit of the prior art.

We claim:

1. The method of replacing an old split-pin assembly mounted in a guide tube of a nuclear reactor by a new split-pin assembly, said tube having a flange, said old split-pin assembly including an oil split pin having a flange secured to a flange of said guide tube by an old nut with the flange of said old split pin engaging the base of a counterbore in the bottom of said flange of said guide tube and the new split-pin assembly including a new split pin also having a flange to be secured to the flange of said guide tube by a new nut; the said method comprising severing said old split pin in the region below said flange of said old split pin into a first pin fragment which is separated from said flange of said old split pin in said guide tube, and a second fragment including said flage of said old split pin and said old nut, which second fragment remains secured to said guide tube with the region of said second fragment where the first fragment was separated exposed, engaging a drill with said second fragment in said exposed region where said first fragment was severed from said old split-pin fragment, said drill being positioned axially of said second fragment and having a bit having a diameter approximately equal to the diameter of the shank of said old split pin, operating said drill to drill axially along said second fragment to separate said second fragment into a third fragment including said flange of said old split pin and a fourth fragment including the remainder of said old split pin and said old nut, said third fragment being removable from said base of said counterbore in the bottom of said guide tube and said fourth fragment being removable from the upper part of said flange of said guide tube, removing said first pin fragment and said third and fourth fragments from said guide tube, and thereafter securing said new split-pin assembly in said guide tube by said new nut with the flange of said new split pin engaging said base of said counterbore in the bottom of said flange of said guide tube.

2. In the method of replacing an old split-pin assembly of a guide tube of a nuclear reactor by a new split-pin assembly, said guide tube having a flange, said old split-pin assembly including an old split pin having a flange secured to said flange of said guide tube by an old nut with the flange of said old split pin engaging the base of a counterbore in the bottom of said flange of said guide tube, said new split pin also having a flange; the method of removing said old split-pin assembly from said guide tube, the said method comprising severing said old split pin in the region below said flange of said old split pin into an a first pin fragment and a second fragment including the remainder of said old split pin, said flange of said old split pin and said old nut, said second fragment remaining secured in said flange of said guide tube by said old nut and said first fragment being separated from said second fragment exposing the region of said remainder of said old split pin where said first fragment was separated, engaging a drill with said second fragment in said exposed region where said first fragment was separated from the remainder of said old split pin, said drill being positioned axially of said second fragment and having a bit having a diameter approximately equal to the diameter of the shank of said old split pin, operating said drill to drill axially along said second fragment to separate said second fragment into a third fragment including said flange of said old split pin removable from said counterbore in the bottom of said flange of said guide tube and a fourth fragment including the remainder of said old split pin and said old nut, removable from the upper part of the flange of said guide tube, and removing said first pin fragment and said third and fourth fragments from said reactor.

3. The method of claim 1 including installing the new split pin in the space vacated by the old split-pin assembly by positioning the new split pin with the flange of said new split pin adjacent the bottom of the base of the counterbore in the flange of the guide tube, thereafter threading the new nut on said new split pin, torqueing the new nut so that said flange of said new split pin is in pressure-engagement with said bottom of said base of said counterbore, and crimping a cup extending from the top of said new nut to said new split pin.

4. Apparatus for replacing an old split-pin assembly secured to a guide tube of a nuclear reactor by a new split-pin assembly, said guide tube having a flange, said old split-pin assembly having an old split pin having a flange secured by a nut to the base of a counterbore in the bottom of said flange of said guide tube and said new split-pin assembly having a new split pin having a flange to be secured by a nut to said base of said counterbore in the bottom of the flange of said guide tube; the said apparatus including a first stand for mounting a guide tube having an old split-pin assembly mounted thereon, purely mechanical severing means, connected to said first stand and positioned thereon to sever said old split pin below the flange of said pin into a first split-pin fragment and a second fragment including the flange of said old pin and the remainder of said old pin and said old nut threaded on said remainder, said second fragment remaining secured to said flange of said guide tube by said old nut and said first fragment being separated from the remainder of said old split pin exposing the region of said remainder of said old split pin when said first fragment is severed, a drill mounted on said first stand in a position such that on rotation of said guide tube through a predetermined angle from the position where said first fragment was severed said drill is positioned generally coaxially with said second fragment, said drill having a bit having a diameter approximately equal to the diameter of the shank of said old split pin, said drill being oriented so that said bit is engageable with said exposed region, and means, connected to said drill, for driving said bit into said exposed region in drilling engagement generally coaxially with said second fragment to sever said second fragment into a third fragment including said flange of said old split pin removable from said counterbore in the bottom of said flange of said guide tube and a fourth fragment including said old nut and the remainder of said old split pin threaded to said old nut, said fourth fragment being removable from the upper part of the flange of said guide tube, and said apparatus also including a second stand spaced from said first stand, and means, on said second stand, for positioning a new split pin and a guide tube in cooperative relationship to be processed for securing the flange at said new split pin by a new nut into engagement with said base of said counterbore in the bottom of said flange of said guide tube.

5. The method of claim 1 wherein the replacing the old split-pin assembly by a new split-pin assembly is practiced with apparatus including a stand on which the guide tube is disposed for the processing for the old split-pin assembly, and the old split-pin assembly is severed into the old split-pin fragment and a second fragment in a first position of said stand and the second fragment drilled in a second position of said stand spaced circumferentially by a predetermined angle from the first position and the method includes the step of rotating the guide tube, after the severing of said old split pin into an old pin fragment and a second fragment, from said first position to said second position, and drilling the second fragment in said second position.

6. The method of claim 5 for replacing the old split-pin assemblies by new split-pin assemblies of a guide tube which includes a pair of split-pin assemblies spaced circumferentially by 180° and the first position of the stand and the second position of the stand are spaced circumferentially by about 180°, and the said method includes the steps of severing one old split pin of one old split-pin assembly in said first position into a split-pin fragment and a second fragment, rotating said guide tube through 180° from said first position to said second position, drilling said second fragment of said one old split-pin assembly in said second position, without rotating said guide tube, severing the other old split-pin assembly into a split-pin fragment and a second fragment in said first position of said stand, rotating said guide tube through about 180°, and drilling said second fragment of said other split-pin assembly in said second position of said stand.

7. The method of claim 2 wherein the method of removing the old split-pin assembly from the guide tube is practiced with apparatus including a stand on which the guide tube is disposed for the removing of the old split-pin assembly and the old split-pin assembly is severed into the split-pin fragment and the second fragment in a first position of said stand and the second fragment is drilled in a second position of said stand spaced circumferentially by a predetermined angle from said first position and the said method includes the step of rotating the guide tube after the severing of said old split-pin assembly into a split-pin fragment and a second fragment from said first position to said second position, and drilling the second fragment in said second position.

8. The method of claim 7 practiced to remove the old split-pin assemblies of a guide tube which includes a pair of split-pin assemblies spaced circumferentially by 180° and the first position and second position are spaced circumferentially by about 180°, and the said method includes the steps of severing one split-pin assembly in said first position into a split-pin fragment and a second fragment, rotating said guide tube through about 180° from said first position to said second position of said stand, drilling said second fragment of said one old split-pin assembly in said second position of said stand, without rotating said guide tube, severing the other old split-pin assembly into a split-pin fragment and a second fragment, then rotating said guide tube through 180°, drilling said second fragment of said other split-pin assembly in said second position of said stand and removing said split-pin fragments and said second fragments from the reactor.

9. Apparatus according to claim 4 for replacing a pair of old split-pin assemblies of a guide tube by new split-pin assemblies, said old split-pin assemblies being spaced circumferentially by 180° about said guide tube, the said apparatus being characterized by that the drill is circumferentially spaced from the mechanical severing means by an angle such that when the guide tube is rotated through about 180° after the severing of one of said old split-pin assemblies into a split-pin fragment and a second fragment by the severing means, the second fragment of said one old split-pin assembly is positioned coaxially with the drill and the other old split-pin assembly is positioned to be severed by said severing means.

10. For use in the replacement of an old split-pin assembly secured to a guide tube of a nuclear reactor with a new split-pin assembly, said guide tube having a flange, said old split-pin assembly including an old split-pin having a flange secured to a flange of said guide tube by an old nut with the flange of said old split pin engaging the base of a counterbore in the bottom of the flange of said guide tube; apparatus including a stand for removing said old split-pin assembly, the said stand including purely mechanical severing means mounted on said stand, means for positioning a guide tube, having an old split-pin assembly secured thereto, on said stand with said severing means in position to sever said old split-pin assembly into a split-pin fragment and a second fragment, said second fragment including said flange of said old split pin joined to the remainder of said old split-pin assembly and said old nut, the severing of said old split-pin assembly exposing the region of said old split pin from which said split-pin fragment was severed, and a drill mounted on said stand spaced circumferentially by a predetermined angle so that when said guide tube is rotated through said angle said drill is positioned to engage said exposed region and to sever said second fragment into a third fragment including said flange and a fourth fragment including said nut joined to the remainder of said split pin.

11. Apparatus for replacing an old split-pin assembly secured to a guide tube of a nuclear reactor by a new split-pin assembly, said guide tube having a flange, said old split-pin assembly having an old split pin also having a flange secured by a nut to the base of a counterbore in the bottom of a flange of said guide tube and said new split-pin assembly having a new split pin having a flange to be secured by a nut to said base of said counterbore in the bottom of the flange of said guide tube; the said apparatus including a first stand for mounting a guide tube having an old split-pin assembly mounted thereon, purely mechanical severing means, connected to said first stand and positioned thereon to sever said old split pin below the flange of said pin into a split-pin fragment and a second fragment including the flange of said old split pin and the remainder of said old split pin and said old nut, the severing of said split-pin assembly exposing the region of said old split pin from which said split-pin fragment is severed, a drill mounted on said first stand in a position such that on rotation of said guide tube through a predetermined angle from said mechanical severing means, said drill is positioned to engage said exposed region and drill said second fragment, and means, connected to said drill, for driving said drill to sever said second fragment into a third fragment including said flange of said old split pin and a fourth fragment including said old nut and the remainder of said old split pin; and said apparatus also including a second stand spaced from said first stand, and means, on said second stand, for positioning a new split pin and said guide tube from which said old split-pin assembly has been removed in cooperative relationship to be processed for securing the flange of said new split pin by a new nut into engagement with the base of the lower counterbore of said flange of said guide tube.

12. The stand of claim 11 wherein said drill has a bit having a diameter approximately equal to the diameter of the shank of the split pin and is mounted on the stand so as to be positioned coaxially with said shank of said second fragment on the rotating of the guide tube from the mechanically severing means by the predetermined angle.

13. The method of claim 1 wherein the old split pin of the old split-pin assembly extends below the undersurface of the flange of the guide tube and the old split pin is severed in the region below said undersurface of said flange of said guide tube without damage to said guide tube.

14. The method of claim 2 wherein the old split pin of the old split-pin assembly extends below the undersurface of the flange of the guide tube and the old split pin is severed in the region below said undersurface of said flange of said guide tube without damage to said guide tube.

15. The method of claim 1 wherein the old split pin of the old split-pin assembly is severed into a split pin fragment and a second fragment in the region between the crotch of the tines of the bifurcated end and the flange.

16. The method of replacing an old split-pin assembly mounted in a guide tube of a nuclear reactor by a new split-pin assembly, said guide tube having a flange, said old split-pin assembly including an old split pin having a flange secured to the flange of said guide tube by an old nut with the flange of said old split pin engaging the base of a counterbore in the bottom of said flange of said guide tube and the new split-pin assembly including a new split pin also having a flange to be secured to the flange of said guide tube by a new nut, with the flange of said new split pin engaging the base of a counterbore in the bottom of said flange of said guide tube; the said method comprising severing said old split pin of said old split-pin assembly in the region below said flange of said old split pin into an old split-pin fragment and a second fragment including the remainder of said old split pin and said flange of said old split pin and said old nut, said old split-pin fragment being separated from said flange of said guide tube and said second fragment remaining connected to said flange of said guide tube with the region of the remainder of said old split pin where the old split-pin fragment was severed exposed, by engagement with said exposed region, severing said second fragment into a third fragment including said flange of said old split pin and a fourth fragment including the remainder of said old split pin and said old nut, removing said split-pin fragment and said third and fourth fragments from said reactor, said third fragment being removed through the counterbore in the bottom of said flange of said guide tube and said fourth fragment being removed from the top of said guide tube, and thereafter securing said new split-pin assembly in said guide tube by said new nut with the flange of said new split pin engaging the base of the counterbore in the bottom of said guide tube.

17. In the method of replacing an old split-pin assembly of a guide tube of a nuclear reactor by a new split-pin assembly, said guide tube having a flange, said old split-pin assembly including an old split pin having a flange secured to said flange of said guide tube by an old nut with the flange of said old split pin engaging the base of a counterbore in the bottom of said nut; the method of removing said old split-pin assembly from said flange; said method comprising severing said old split pin in the region below said flange of said old split pin into an old split-pin fragment and a second fragment including the remainder of said old split pin and said flange of said old split pin and said old nut, said old split-pin fragment being separated from said flange of said guide tube and said second fragment remaining connected to said flange of said guide tube; with the region of the remainder of said old split-pin where the old split-pin fragment was severed exposed, by engagement with said exposed region, severing said second fragment into a third fragment including said flange of said old split pin and a fourth fragment including the remainder of said old split pin and said old nut, removing said split-pin fragment and said third and fourth fragments from said reactor, said third fragment being removed through said counterbore in the bottom of said guide tube.

18. The method of claim 16 wherein the replacement of the old split-pin assembly by a new split-pin assembly is carried out with apparatus including a stand on which the guide tube is disposed for the processing of the old split-pin assembly and the old split pin is severed in a first position of said stand and the second fragment is separated into third and fourth fragments in a second position of said stand spaced circumferentially by a predetermined angle from said first position and the said method includes the step of rotating the guide tube, after the severing of said old split pin into an old split-pin fragment and a second fragment, from said first position to said second position and separating said second fragment into third and fourth fragments with the second fragment in said second position by drilling of said second fragment in said second position.

19. The method according to claim 18 of replacing both split-pin assemblies of a guide tube wherein the guide tube includes a pair of split pins spaced circumferentially by 180° and the first position and second position of said stand are spaced circumferentially 180°, and the said method includes the steps of severing one old split-pin assembly in said first position of said stand into a split-pin fragment and a second fragment, then rotating said guide tube through 180° from said first position to said second position of said stand, severing said second fragment of said one old split-pin assembly into the third and fourth fragments in said second position of said stand, severing the other old split-pin assembly into a split-pin fragment and a second fragment in said first position of said stand, then rotating said guide tube through 180° so that the split-pin fragment of said other split-pin assembly is in said second position of said stand, and severing said second fragment of said other old split-pin assembly into third and fourth fragments in said second position of said stand.

20. The method of claim 1 wherein the old split pin of the old split-pin assembly is severed above the region where the tines of said old split-pin are separated.

21. The method of claim 2 wherein the old split pin of the old split-pin assembly is severed above the region where the tines of said old split-pin are separated.

22. The stand of claim 11 wherein the drill has a bit having a diameter slightly greater than the diameter of the shank of the split pin and is mounted on the stand so as to be positioned coaxially with the second fragment on the rotation of the guide tube from the mechanically severing means by a predetermined angle.

23. The method of replacing an old split-pin assembly mounted in a guide tube of a nuclear reactor by a new split-pin assembly, said guide tube having a flange, said old split-pin assembly including an old split pin having a shank terminating in tines at the lower end and having a flange between said tines and the upper end of said old split-pin, said old split-pin assembly being mounted in said guide tube secured to the flange of said guide tube by an old nut with the flange of said old split pin engaging the base of a counterbore in the bottom of said flange of said guide tube and the new split-pin assembly including a new split pin also having a flange to be secured to the flange of said guide tube by a new nut with the flange of said new split pin engaging the base of the counterbore in the bottom of said flange of said guide tube; the said method comprising severing said old split pin of said old split-pin assembly in the region between the crotch of said tines and said flange of said old split pin into a first pin fragment and a second fragment including the remainder of said old split pin, and said flange of said old split pin and said old nut, said first fragment being separated from said flange of said guide tube and said second fragment remaining connected to said flange of said guide tube with the region of the remainder of said old split pin where the old split-pin fragment was severed exposed, by engagement with said exposed region, severing said second fragment into a third fragment including said flange of said old split pin and a fourth fragment including the remainder of said old split pin and said old nut, removing said first pin fragment and said third and fourth fragments from said reactor and thereafter securing said new split-pin assembly in said guide tube by said new nut with the flange of said new split pin engaging the base of the counterbore in the bottom of said guide tube.

24. In the method of replacing an old split-pin assembly of a guide tube of a nuclear reactor by a new split-pin assembly, said guide tube having a flange, said old split-pin assembly including an old split pin having a shank terminating in tines and having a flange between said tines and the upper end of said old split pin, said old split-pin assembly being mounted in said guide tube secured to said flange of said guide tube by an old nut with the flange of said old split pin engaging the base of a counterbore in the bottom of the flange of said guide tube; the method of removing said old split-pin assembly from said flange; the said method comprising severing said old split pin in the region between the crotch of said tines and said flange of said old split pin into an old split-pin fragment and a second fragment including the remainder of said old split pin and said flange of said old split pin and said old nut, said old split-pin fragment being separated from said flange of said guide tube and said second fragment remaining connected to said flange of said guide tube with the region of the remainder of said old split pin where the old split-pin fragment was severed exposed, by engagement with said exposed region, severing said second fragment into a third fragment including said flange of said old split pin and a fourth fragment including the remainder of said old split pin and said old nut, removing said split-pin fragment and said third and fourth fragments from said reactor, said third fragment being removed through said counterbore in the bottom of said flange of said guide tube.

25. In the method of replacing an old split-pin assembly of a guide tube of a nuclear reactor by a new split-pin assembly, said old split-pin assembly having an old split pin and an old nut, said old split pin having a flange intermediate its ends, said guide tube having a flange having an upper counterbore and a lower counterbore coaxial with said upper counterbore and in communication therewith through a coaxial hole through the bases of said counterbores, said old split-pin assembly being mounted in said counterbores with said old split pin extending coaxially through said counterbores and being secured in said counterbores by said old nut with said nut engaging the base of said upper counterbore and the flange of said old split pin engaging the base of said lower counterbore, whereby removal of said old split-pin assembly by exertion of an axial upward force on said old split pin is prevented by the engagement of said flange of said old split pin with the base of said lower counterbore; the method of removing said old split-pin assembly from said guide tube which comprises first removing a portion of the shank of said old split pin between said flange and that end of said old split pin on the side of said lower counterbore thus exposing the cross section of the remainder of said shank, then by engagement with said exposed cross section, separating said flange of said old split pin from the shank of said old split pin, removing said flange of said old split pin through said lower counterbore by exerting a downward force on said flange of said old split pin, and removing the remainder of said old split-pin assembly including said old nut and the remainder of said old split pin from the upper counterbore.

* * * * *